US006621006B2

United States Patent
Smith

(10) Patent No.: US 6,621,006 B2
(45) Date of Patent: Sep. 16, 2003

(54) SIZING TAPE FOR USE IN A CABLE SPLICE CASE

(76) Inventor: Donald J. Smith, 32340 Saddle Mountain Dr., Westlake Village, CA (US) 91361

( * ) Notice: Subject to any disclaimer, the term of this patent is extended or adjusted under 35 U.S.C. 154(b) by 0 days.

(21) Appl. No.: 09/992,263

(22) Filed: Nov. 26, 2001

(65) Prior Publication Data

US 2003/0098174 A1 May 29, 2003

(51) Int. Cl.$^7$ ............................................. H02G 15/18
(52) U.S. Cl. ............................................................. 174/93
(58) Field of Search ........................ 174/92, 93, 77 R, 174/117 A

(56) References Cited

U.S. PATENT DOCUMENTS

| | | |
|---|---|---|
| 3,337,681 A | 8/1967 | Smith |
| 3,499,972 A | 3/1970 | Smith |
| 3,619,481 A | 11/1971 | Smith |
| 3,639,135 A * | 2/1972 | Hohman et al. ............ 427/368 |
| 3,692,926 A | 9/1972 | Smith |
| 3,701,839 A | 10/1972 | Smith |
| 4,026,012 A | 5/1977 | Smith |
| 4,337,374 A | 6/1982 | Smith |
| 4,358,634 A * | 11/1982 | Dienes ....................... 138/128 |
| 4,460,227 A * | 7/1984 | Ball ....................... 174/152 G |
| 5,175,032 A * | 12/1992 | Steele et al. ................ 138/104 |
| 5,502,281 A * | 3/1996 | Schoelling et al. ....... 174/77 R |
| 5,568,584 A | 10/1996 | Smith |
| 5,793,921 A | 8/1998 | Wilkins et al. |
| 6,177,634 B1 | 1/2001 | Smith |

* cited by examiner

Primary Examiner—Chau N. Nguyen
(74) Attorney, Agent, or Firm—Thomas W. Secrest

(57) ABSTRACT

In a break in a communication cable having individual information transmitting members it is necessary to join the individual transmitting members and to repair the cable. After the individual transmitting members have been joined a splice case is positioned around the communication cable. The splice case protects the cable from the elements. A sizing tape can be wrapped around the splice and also around the cables before being positioned in an end seal and also around the end seal before being positioned in the splice case. The sizing tape may include two commercially available materials such as a flexible yieldable base and a friction material on the base. The base has a first surface and a second surface. If a friction material is bused it is positioned on the first surface and bonds and adheres to the first surface and is integral with the first surface. The friction material does not bond and is not integral with the second surface. This makes it possible for the sizing tape to be made into a roll for ease of use and carrying. The friction material assists in positioning the sizing tape on the cable and also on the end seal, but it is not essential to the sealing or gripping function of the sizing tape.

54 Claims, 7 Drawing Sheets

SIZING TAPE FOR USE IN A CABLE SPLICE CASE

CROSS-REFERENCES TO RELATED PATENT APPLICATIONS (if any)

There are patent applications Ser. No. 08/783,693 with a filing date of Jan. 15 1997; Ser. No. 09/723,361, filing date Nov. 28, 2000; Ser. No. 29/150,501, filing date Nov. 26, 2000; and Ser. No. 29/150,502 filing date Nov. 26, 2001.

The subject applicant has the following United States patents:

| NUMBER | ISSUING DATE |
| --- | --- |
| 3,337,681 | 1967 August 22 |
| 3,499,972 | 1970 March 10 |
| 3,619,481 | 1971 November 9 |
| 3,692,926 | 1972 September 19 |
| 3,706,839 | 1972 October 31 |
| 4,026,012 | 1977 May 31 |
| 4,337,374 | 1981 June 29 |
| 5,568,584 | 1996 October 22 |
| 5,793,921 | 1998 August 11 |
| 6,177,634 | 2001 January 11. |

STATEMENT AS TO RIGHTS TO INVENTIONS MADE UNDER

FEDERALLY SPONSORED RESEARCH AND DEVELOPMENT (if any)

This invention was developed with private funds and there was no federally assisted fund.

REFERENCE TO A "MICROFICHE APPENDIX"

This section is not applicable to this subject matter.

BACKGROUND OF THE INVENTION

1. Field of the Invention

A communication cable as used in television, telephone, internet, fax, multimedia, and the like comprises a number of individual information transmitting members. These information transmitting members may be a metallic wire such as a copper wire or may be a fiber optic or other suitable transmission members. Again, there are a number of these information transmitting members in the cable.

Sometimes it is necessary to splice a communication cable. The cable may be damaged or broken, and it is necessary to repair the damaged part of the cable. Or, it may be that more information transmitting members are to connect with the cable to go to another destination.

The cable may be an elevated cable such as supported by a pole or a telephone pole. The cable may be fifteen to thirty feet off of the ground. Or, the cable may be a buried cable.

The communication cable as manufactured has a protective outer sheet of material. With damage to the communication cable and to the information transmitting members this outer protective sheet may be broken and therefore it is possible for extraneous material such as water, snow, dust, and dirt to work into the interior of the communication cable and maybe even into the individual information transmitting members so as to interfere with the transmission of information by the cable.

The severed information transmitting members are spliced together to repair the damage. In practice, and after the communication cable has been repaired, a splice case is positioned around the spliced region of the cable so as to act as a protective outer shield of material in the spliced area. The splice area must be weather proof to rain, snow, hail, freezing weather, a combination of rain and freezing weather, heat, high temperatures, ultraviolet light from the sun, from mechanical stress due to swaying of the cable and the wind blowing against the communication cable, fuel resistant to material such as gasoline, diesel, oil, and kerosene, flame resistant to low temperature flame, and must be resistant to the internal air pressure inside of the cable as the internal pressure inside of the cable is about ten pounds per square inch, PSI.

Further, the splice case must be of such construction that it can be readily assembled in the field. Quite often, in repairing the communication cable it is necessary for the repair person to be elevated off of the ground by fifteen feet or more such as thirty feet. Therefore, the repair person must be able to manipulate the splice case for ease of positioning over the splice in the communication cable. This is also true if the cable is buried underground or in a vault.

The splice case includes a tubular protective case having front and rear end seals. The left and right ends of the tubular protective splice case are configured to form integrally with the front end seal and the rear end seal. There are means for uniting the tubular protective case having front and back covers. In order to protectively seal the protective splice case there is used a sizing tape between the cable and the end seal and a sizing tape between the end seal and the tubular protective case.

The sizing tape may comprise a base of a flexible yieldable sealing material and having on one surface a friction material. The base of the sizing tape should be resilient, foldable, stretchable, deformable, and weather resistant to rain, snow, hail, freezing weather, a combination of rain and freezing weather, heat, and high temperature, ultraviolet light, from mechanical stress due to swaying of the cable and the wind blowing against the communication cable, fuel resistant to material such as gasoline, diesel, oil and kerosene, flame resistant to low temperature flame and resistant to the internal air pressure inside the cable. After the sizing tape has been applied to the front and back covers, the right and left end seals and to the cable the splice case can be closed. Normally, nuts and bolts are used to join the front and back covers of the splice case. In place of nuts and bolts there may be used rivets or other suitable closing means. Sometimes, it is necessary to open the splice case and to perform various operations on the information transmitting members in the cable. The adhesive on the splice case may make it difficult to do a good job in regard to the information transmitting members of the cable. Also, the workman has to be careful in regard to separating the front and back covers and the right and left end seals so as not to damage them. The separation operation can be time consuming and may cause damage to the front and back covers of the splice case.

It is desirable to have a sizing tape which can be used in positioning the cable in the front end seal and in the rear end seal and also for positioning the cable in the tubular protective case and without having the difficulty of working with an adhesive which can adhere to fingers, gloves, clothes, and to the splice case. In some instances it is beneficial to discard the old splice case with the adhesive on its members and the same holds true for discarding the right and left end seals with adhesive on the end seals.

It is desirable to have a sizing tape which has a friction material which does not adhere to the repair person, fingers, gloves, clothes, and to both surfaces of the sizing tape, and to the splice case and which sizing tape can assist in positioning the cable or cables in the front and rear end seals and also for positioning the end seals in the tubular protective splice case. Such a sizing tape has the advantage in that it is easy to separate the tubular protective case into front and back covers and also to remove the front and rear end seals from the tubular protective covers and also to position the cable in the front and rear end seals. There is a saving in time and frustration by the repair person splicing the cable.

2. Description of Related Art Including Information Disclosed Under 37 CFR 1.97 and 37 CFR 1.98

There has been done considerable work in regard to protective splice cases for communication cables and for covering and for protecting the splice in a communication cable.

One of the first patents is U.S. Pat. No. 3,337,681, issuing date of Aug. 22, 1967 of Donald J. Smith, subject applicant. There is a splice case comprising a tubular member 10 and two end seals 12. The tubular member 10 comprises two half tubular members 14. The communication cable in the spliced area can be positioned inside of the tubular member 10. The end seals 12 receive the communication cables 50 and 52. In order to have a tight seal it is necessary to have a tight seal between the communication cables 50 and 52 and the end seal 12. The end seal 12 comprises two half tubular members 30. The two half tubular members 30 can be formed into the tubular member 10, at the site of usage, for receiving the communication cables 50 and 52. An artisan can take a pocket knife or similar object and cut along the indicia 36 in the end seals 12. The end seals 12 are modified to receive the cables 50 and 51. Then, the tubular member 10 can be positioned around the end seals 12 with the end seals 12 positioning the communication cables 50 and 52 in the splice case. The result is a splice case protecting and covering the splice between two communication cables. Again, nut and bolt combination 22, securely join together the two half tubular members 14.

U.S. Pat. No. 5,568,584, issuing date of Oct. 22, 1996, of Donald J. Smith, subject applicant, relates to a fiber optic closure with a cable adaptor spool. The fiber optic closure or splice case protects and isolates the splice of a fiber optic cable. The patent states: "The cable is prepared before placing the cable in the adaptor spool. The cable is wrapped with several windings of a high coefficient of friction, partially adhesively-backed tape. The adhesive provides a seal between the layers of the tape as well as the tape and the optical fiber cable sheath. A central strip around the outer layer of tape is then wrapped with a layer of mastic sealant. The prepared cable is placed into the adaptor in a cable entrance port. Cables are prepared prior to assembling the adaptor. Vacant cable entrance ports are sealed with a plug."

"Still referring to FIG. 4, a thin layer of sealing material such as mastic 72 is applied over the outer layer of neoprene tape 70 of the wrapped cable 14." From the foregoing it is seen that this patent teaches of a tape and the adhesive on the tape and the layer of mastic sealant over the tape then the adhesive. In essence, there are three layers of the wrapped material for wrapping around the cable.

U.S. Pat. No. 5,793,921 is a divisional patent application of U.S. Pat. No. 5,568,584. The subject matter of the two patents in regard to three layers of a material around a cable is the same.

U.S. Pat. No. 6,177,634, issuing date of Aug. 11, 1998 of coinventor of Donald J. Smith, subject applicant, is for a splice closure. In the patent it is stated: "In still further preferred embodiments, the end sections of the cable are first wrapped with a narrow strip (about ½ inch wide) of soft and sticky sealing material (such as mastic sealant), then wrapped with a sizing tape (about 4 inches wide) then finally with a strip of composite sealing material (about one inch wide) (with the adhesive substrate contacting and adhering to the sizing tape) before the cables are clamped between the respective half end seals. Further in the patent it is stated: "In operation, to splice the cables 33–35, the respective end sections of the entering cables are wrapped with narrow (about ½ inch wide) strip of soft and sticky sealing material, then wrapped with a sizing tape (about 4 inches wide) and finally wrapped with a further layer of composite sealing materials (about one inch wide) (with the adhesive substrate facing the sizing tape). The layers 38 of the composite sealing material and the sizing tape wrapped around the cables 33–35 form a cross-section just barely larger than the cross-section of the generally circular, longitudinal cable entrances in the left and right end seals. A simple (throwaway) cardboard gauge may be supplied to the field technician to determine when a sufficient number of turns of the sealing material and the sizing tape have been applied to the cables. The innermost wrap of soft and sticky material serves to close any gap between the cables 33–35 and the innermost layer of the sizing tape. The soft and sticky sealing material may be a suitable mastic sealant."From this it is seen that there are three separate layers of material applied to the cable such as (1) a soft and sticky material; (2) a sizing tape; and (3) a composite sealing material. The application of the three layers of material to the cable is time-consuming and expensive and requires more storage facilities.

Patent application Ser. No. 08/783,693, filed on Jan. 15, 1997, of Donald J. Smith, subject applicant and now on appeal before the United States Patent Office Board of Appeals is directed to a composite sealant and a splice case. The splice case is used for protecting the splice of a cable having a multitude of information transmitting members such as wire, copper wire, and fiber optic strands. This patent application on page 8 states: "FIG. 9, in an end view on an enlarged scale, illustrates the composites comprising a sealant, a separator and an adhesive between the sealant and the separator." On page 9 it is stated: "There is a composite 23 comprising a sealant 24 and an adhesive 25. A separator 27 may be placed over the adhesive 25 and peeled away when the composite is being applied." On page 16 of the patent application it is stated: "The composite 23 is made of the sealant 24 and the adhesive 25. The sealant 24 can be cured CPDM, halogenated butyl, hydrated alum, resins, paraffinic oil or polybutene, or polyisobutene. The adhesive 25 can be butyl-halogenated butyl, hydrated alum, resinic polybutene, and cured polyisobutene. The separator 27 can be wax paper." It is seen that the composite comprises three members, viz., the sealant, the adhesive, and the separator, in one unit. To use the composite for sealing purposes it is necessary to remove the separator to expose the adhesive which can be time consuming and, possibly, sticky and messy.

U.S. Pat. No. 3,692,926, issuing date of Sep. 19, 1972 of Donald J. Smith, subject applicant relates to a device for sealing the ends of a splice case. There is an assembly for sealing both ends of the splice case, said assembly comprising a pair of end seals and adjustable means for rigidly aligning said end seal relative to each other. Said end seals each comprising a pair of mating end pieces having channels provided across the mating surfaces thereof to accommodate one or more cables; means for securing said end pieces altogether, said securing means comprising an annular member located across the periphery of said mating end seals, said annular member having means receiving said alignment means therein. The subject invention distinguishes from this patent as the subject invention is directed more to a sizing tape and the combination of the sizing tape with the communication cables and the end seals.

U.S. Pat. No. 3,619,481, issuing date of Nov. 9, 1971 of Donald J. Smith, subject applicant, relates to an enclosure for an electrical cable splice. There is presented an enclosure for an electrical cable splice comprising a generally rectangular sheet of flexible material having first and second sides and first and second edges, the material at each of said sides being folded over to form pockets extending along the entire length of said sheet; a bar of rigid but deformable material positioned in each of ten said pockets and extending along the length thereof; a porous spacer mat adhered to said sheet of flexible material between the edges thereof and spaced inwardly from said edges; a strip of sealing material positioned adjacent to each edge of said sheet of material and extended from said side; fastening means for holding said bars together at each end thereof upon folding of said sheet of material to form an enclosure around electrical cables, said strips of sealing material adapted to encase said cables and form seals therewith, said bars being deformable outwardly to form an opening for receiving a charge of encapsulating resin. The subject invention distinguishes from this invention in that there is used a sizing tape for wrapping cables with respect of the end seal and there is used a sizing tape for wrapping end seal with respect to the splice case. There is substantially no correlation between this patent and the subject invention.

U.S. Pat. No. 3,499,972 issuing date of Mar. 10, 1970 of Donald J. Smith, subject applicant, relates to a connector in connection with sheath cable shield. As an article of manufacture, a connector for making electrical contact to the shield of an electrical cable having a protective sheath overlying said shield and an insulating layer underlying said shield comprising a base of conductive material adapted to be brought into engagement with said shield, said base being curved to conform to the inner surface of said shield; screw threaded stud means mounted on said base and extending upwardly therefrom; and a bridge adapted to be brought into engagement with said protective sheath, said bridge including means curved to conform to the outer surface of said sheath, said bridge having a passageway receiving said stud means, a nut engaging said stud means fastening said bridge to said base. The subject invention relates to a sizing tape for connecting with a communication cable and an end seal and also for connecting with the end seal and the splice case. The subject matter of U.S. Pat. No. 3,499,972 and the subject invention are entirely different.

U.S. Pat. No. 4,337,374, issuing date of Jun. 29, 1982 of Donald J. Smith, subject applicant, relates to a service wire splice enclosure. There is provided an enclosure for an electric cable splice suitable for burial in the ground. An enclosure which provides moisture-proofing and mechanical protection for the splice. A pair of shells which slide together to form a box-like enclosure having a main compartment, an intermediate compartment, and an entrance passage. A pair of cables is positioned in the entrance passage with the cables passing through the intermediate compartment into the main compartment where the splices of pairs of conductors are located. Each of the shells has a quantity of sealant in the main section so that when the two sections are brought together with the cable splice there between, the splice components are completely surrounded by the sealant in the main compartment, and sealant is forced into the intermediate compartment around the cables. The subject invention is directed to a sizing tape for use with communication cables and end seals and also for use with end seals and the splice case or enclosure. The two subjects are different.

The sizing tape of this invention comprises a base material having a first surface and a second surface. On the first surface there may be positioned a friction material to assist in positioning the sizing tape while the sizing tape is being applied to wrap the cable or to wrap the end seal. The base is a flexible, yieldable material, non-tacky, resilient, non-adhesive, foldable, stretchable, deformable, and weather resistant to rain, snow, hail, freezing weather, a combination of rain and freezing weather, heat, high temperature, ultra violet light. The abrasive friction material is positioned in a strip on the first surface and adheres to and is integral with the first surface as the friction material does not adhere to the second surface. The sizing tape can be formed into a roll so that the sizing tape can be unwound when needed for use with the splice case. The friction material adheres to and is bonded with the first surface but does not adhere to the second surface. As a result it is possible to form the sizing tape into a roll as well as the sizing tape being flat. The friction material on the first surface of the base allows the sizing tape to temporarily position the sizing tape with respect to the splice case so that a cable can be wrapped with the sizing tape with respect to the end seal and the end seal can be wrapped with the sizing tape with respect to the splice case. From experimentation with the sizing tape I have found that a sheet of flexible weather resistant neoprene free of material, such as an adhesive, on its surfaces can be used in the splice case. From experimentation with the sizing tape I have found that a sheet of flexible weather resistant neoprene free of material, such as an adhesive, on its surfaces can be used in the splice case.

BRIEF SUMMARY OF THE INVENTION

This invention is for a sizing tape comprising a sheet of flexible weather resistant material having a first surface and a second surface. On the first surface there may be a friction material integral with said weather resistant material. The friction material may be in rows on the first surface or may be separated areas on the first surface. The friction material should be less than one-third the area of the first surface. It has been found from experiment that if the friction material is covering the first surface completely the effect of the friction material on restricting the movement of the sizing tape has been decreased considerably. Therefore, the friction material should be in small areas not to exceed one-third the area of the first surface. The friction material is integral with the first surface of the weather resistant material. The friction material, after being applied to the first surface, does not bond to the second surface of the weather resisting material thereby making it possible to form a roll of sizing tape or to package the sizing tape in a roll. The sizing tape, with or without the friction material, is used to increase the diameter of a cable in the opening in the end seal so as to seal the cable entrance into the end seal and also to preclude the cable from pulling out of the end seal and to preclude extraneous material entering the splice case. Similarly the effective diameter of the end seal is increased with respect to the tubular splice case so as to prevent extraneous material entering into the splice case and to preclude the end seal pulling away from the tubular member of the splice case.

BRIEF DESCRIPTION OF THE SEVERAL VIEWS OF THE DRAWING(S)

With respect to the drawings it is seen that:

DETAILED DESCRIPTION OF THE INVENTION

Figure 1:
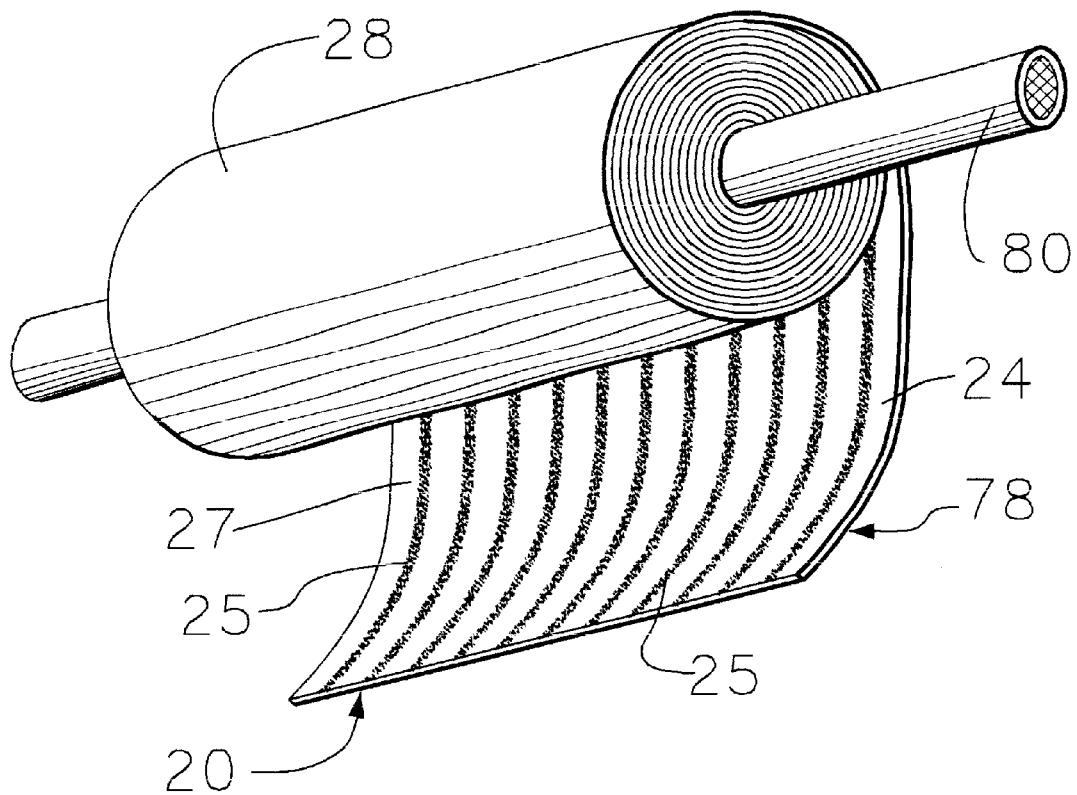
FIG. 1 is a perspective view of a roll of sizing tape showing the base and the strip of friction material on the first surface of the base.
Figure 2:
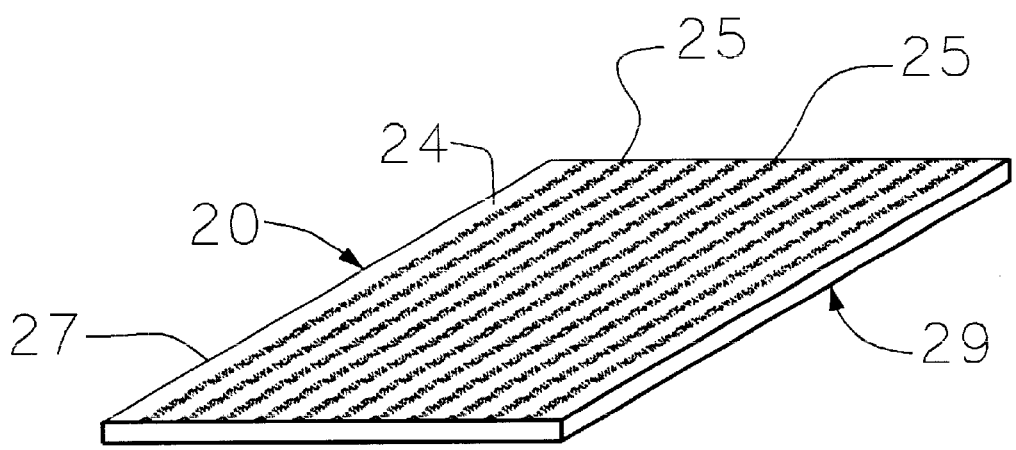
FIG. 2 is a perspective view of a rectangular piece of the sizing tape illustrating the base and the friction material on the first surface of the base.
Figure 8:
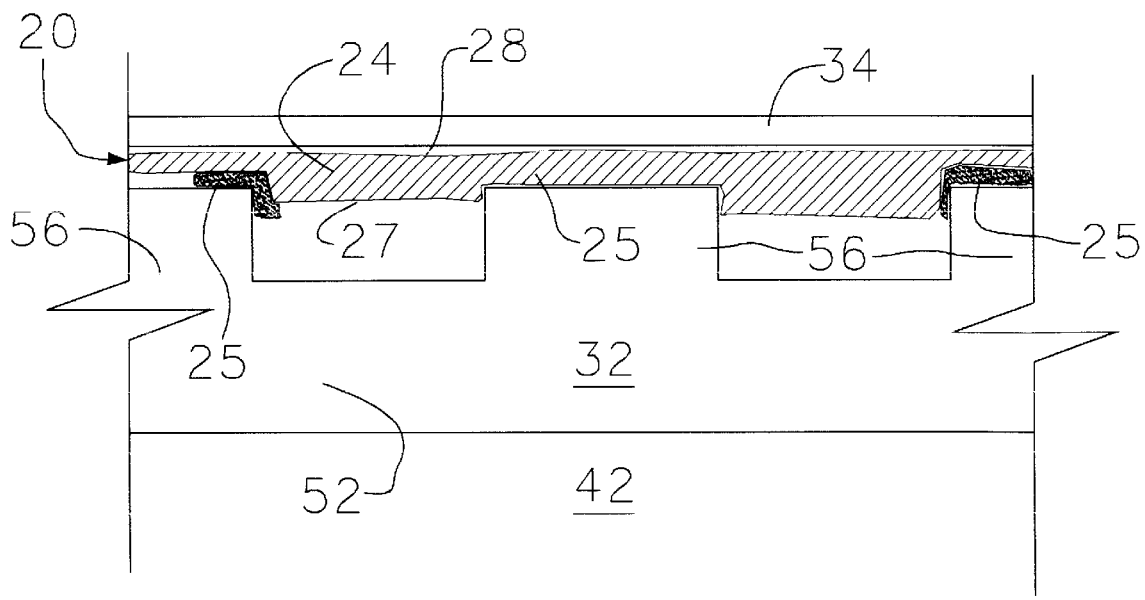
FIG. 8 is a fragmentary cross-sectional exploded view of the sizing tape positioned on the circumferential periphery of an end seal with some of the sizing tape in the recesses between the ridges on the periphery of the end seal.
Figure 10:
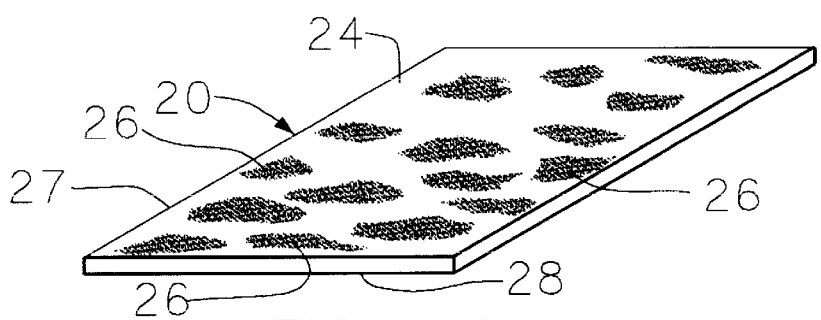
FIG. 10 is a view of sizing tape as a flat sheet with splotches of friction on the first surface.
Figure 11:
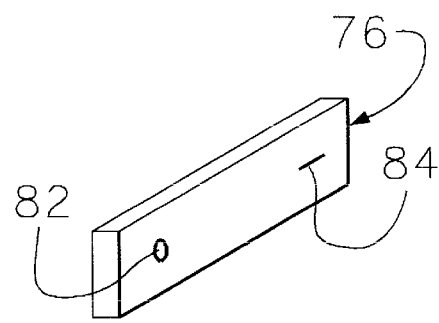
FIG. 11 is a perspective view of a sealant and illustrates a passageway and a slit for receiving a nut and bolt combination.

With respect to FIGS. 1, 2, 8, and 10 it is seen that there is a sizing tape 20. There is a base 24 having a first surface 27 and a second surface 28. In FIGS. 1, 2, and 8 it is seen that there are ribbons of friction material 25 on the first surface 27. In FIG. 10 it is seen that there are splotches 26 of friction material 25 on the first surface 27. The friction material 25 is applied as a liquid neoprene material and is allowed to dry and cure on the first surface 27. There are a number of suppliers of neoprene products such as AE Yale Enterprises, Foster Products Corporation, and RBX Corporation. The friction material 25 adheres to and is integral with the first surface 27. After being applied to the first surface and drying and curing the friction material 25 does not adhere to and does not bond to the second surface 28. This makes it possible to form a roll 22 of the sizing tape 20 as illustrated in FIG. 1. Also, the rectangular sizing tape 29 can be stacked one piece on the other without the friction material 28 and the second surface 28 bonding and adhering to each other.

In the drawings it is seen that the splice case comprises a tubular member 30 and two end seals 32.

The tubular member 30 is composed of two half tubular members 34 having in a lateral cross-sectional view a configuration of a semi-circular member. On the free edges of the semi-circular member 34 there is a flange 36 which bends back on the member 34 to form a lip 38. On each member 34 there are two flanges 36, one on each free edge, and 180 degrees apart.

In the flanges 36 there are holes 40. To assemble the two half tubular members 34 into the tubular member 30 a number of nut and bolt combinations 41 are positioned in the openings 40 of two adjacent flanges 36. As is seen, in FIG. 3 there is formed the tubular member 30.

The half tubular member 34, 36, and 38 is preferably made of a resistant metal, such as stainless steel. In actual usage I have found stainless steel to be desirable. However, many splice cases made as described in the reference U.S. Pat. No. 3,337,681 are of plastic material such as polypropylene.

One particular model has a half-longitudinal tubular member of a length of about seventeen and seven-eights inches (17⅞") and the stainless steel of a thickness of approximately 0.040 inches to 0.045 inches. The stainless steel may be 302 stainless steel. The flange 36 may have a width of nine-sixteenths of an inch (9/16") inside and the lip may be approximately one-eights of an inch (⅛") in length. The holes 49 may be one-fourth (¼") holes.

Figure 4:
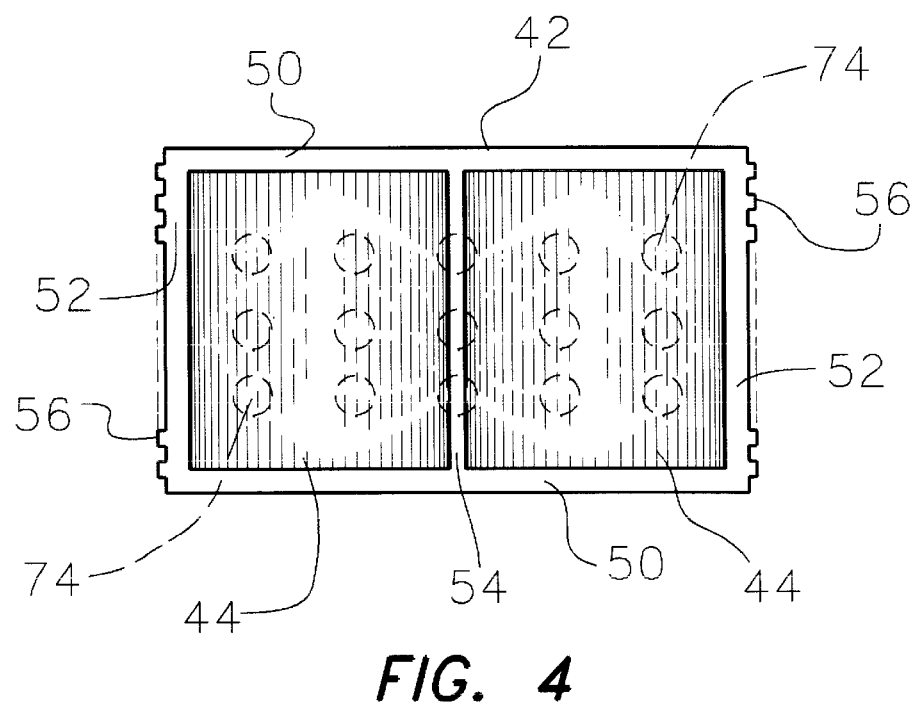
FIG. 4 is a view looking at the interior of an end seal and shows two semi-cylindrical longitudinal cavities, side walls, end walls, and the circumferential peripheral ridges.
Figure 5:
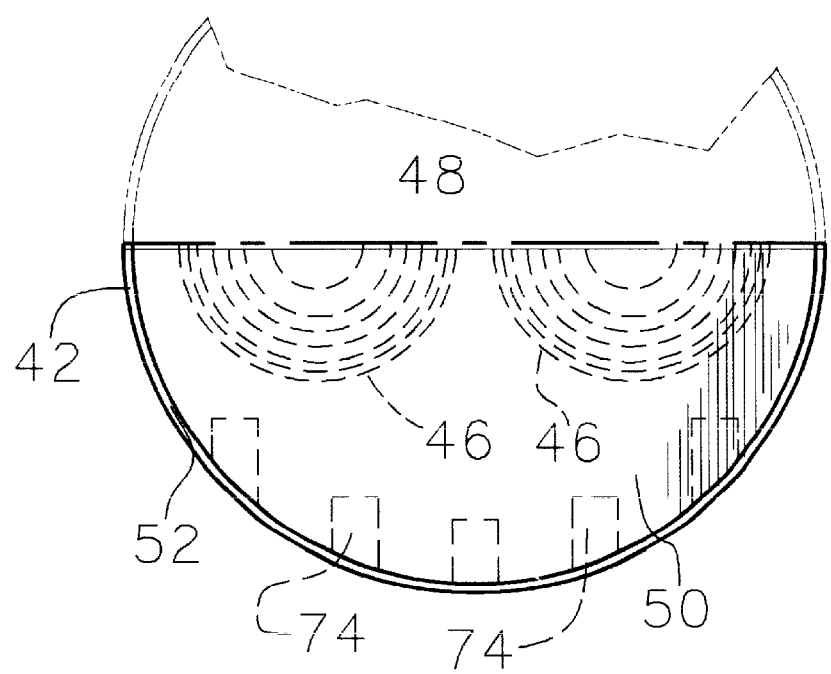
FIG. 5 is a fragmentary view looking at the end of an end seal, and shows one half of the end seal in solid line and indicia for indicating where the end seal should be removed to receive a combination of a communication cable and sealant, and fragmentarily shows the other half of the end seal.

The end seal 32 comprises two mating half tubular members 42, see FIGS. 4 and 5. In FIG. 4 the observer is looking at the interior of the half tubular member 42. In FIG. 5 the observer is looking at the end of a half tubular member 42, see the drawing in solid line. From FIGS. 4 and 5 it is seen that the half tubular member 42 is, in lateral cross-sectional view, of a semicircular cylindrical configuration.

In FIG. 4 it is seen that the half tubular member 42 is hollow and comprises two longitudinal cavities 44 in a lateral cross-sectional view of a semicircular configuration. Actually, in FIG. 5 there is illustrated by phantom lines 46 the semi-circular appearance of these cavities. In FIG. 5 it is seen that there are numerous concentric phantom lines 48. The specifically identified phantom line 46 indicates the dimension of the two cavities 44 in the half tubular member 42. The other concentric phantom lines 48 are indicia to assist a repairman in the cutting of end walls 50 for receiving a communication cable. At the junction of the two cavities 44 there is indicated a dividing wall 54.

In FIG. 4 it is seen that the semi-cylindrical longitudinal cavities 44 define opposed end walls 50 and semi-circular side walls 52 in the half tubular member 42. On the half tubular member 42 there are a number of circumferential peripheral ridges 56.

The member 42 may be made of plastic such as polyethylene, or polypropylene or another suitable plastic. I have made the member 42 from black polyethylene. The length of the member 42 or the side 52 is approximately one and eleven-sixteenths inches (1 11/16") and the thickness of the wall 52 at its narrowest place is approximately 0.150". The radius of the member 42 at the end wall 50 is approximately one and seven-eighths inches (1⅞") and the thickness of the end wall 50 is approximately three-thirty-seconds of an inch (3/32"). The thickness of a ridge 56 is approximately 0.025 inches, and the radius of the cavity 44 is approximately 0.925 inch. These are the dimensions for a particular member 42. It is to be realized that the dimensions of the tubular member 30 and the end seal 32 may vary to accommodate the particular communication cable to be protected.

Figure 3:
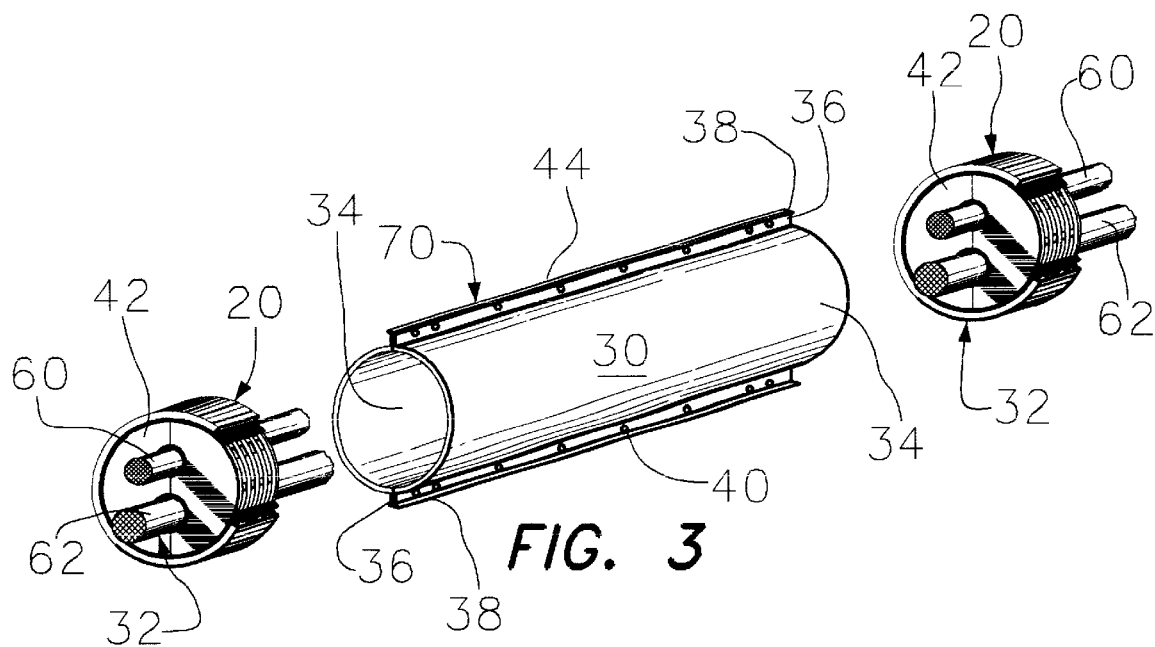
FIG. 3 is an expanded perspective view showing a splice case as a tubular member, an end seal, and a fragmentary part of a communication cable positioned in the end seal with sizing tape around the communication cable and also with sizing tape around the circumference of the end seal.
Figure 7:
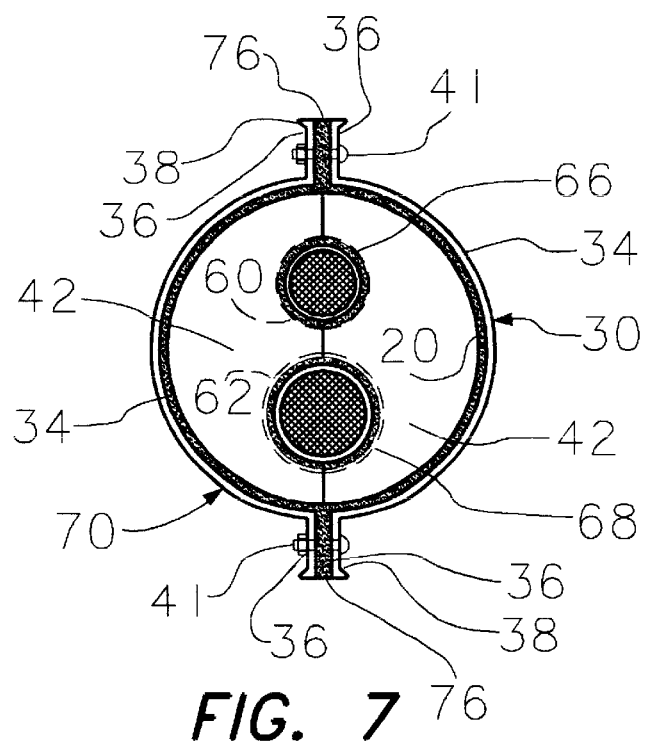
FIG. 7 is an end view illustrating the two tubular members of the splice case around the two half shells of the end seal with the sizing tape between the end seal and the two tubular members and also with the sizing tape around two different size communication cables positioned in the end seal.

In FIGS. 3, 7, and 8 it is seen that the sizing tape 20 is on the outside of end seal member 32. The friction material 26 is in contact with the semi-circular side wall 52 and the peripheral edges 56 on the circumferential surface of the end seal member 32. The sizing tape 20 comprises the base 24 and the friction material 25 or 26. The base 24 may be, to name a few materials, neoprene, EPDM, or vinyl nitrile. The base 24 has a first surface 27 and an opposed second surface 28. On the first surface there is positioned a ribbon 25 or a splotch 26 of friction material which is dried and cured neoprene. It is preferable that the friction material be a non-conductor of electricity and be an insulator. The friction material is so positioned on the first surface 27 and becomes integral with the base 24. The friction material and the first surface adhere to each other and become integral with each other so as to make it difficult to separate the first surface and the friction material. The friction material and the second surface do not adhere to each other or loosely adhere to each other thereby making it possible to form the sizing tape 20 in the roll 22 or to position the sheets of the friction material in a stack. The friction material 26 should be in spaced apart ribbons or spaced apart splotches. From experimentation it is better to have the ribbons spaced apart. If the friction material 25 or 26 is spread over the first surface 27 the friction material 25 or 26 does not function as well as when positioned in ribbons or strips or splotches. There appears to be a synergistic effect between the base 24 and the friction material 25 or 26 in having the friction material 26 in ribbons or strips or splotches instead of covering the first surface 27 of the base 24. The distance between he ribbons of friction material should be at least approximately two times the width of the friction material or the splotches 26 should cover not over one-third of the first surface 27.

The friction materials 25 and 26 assist in positioning the sizing tape 20 on the communication cables 60 and 62 and the end seal 32 in assembling the end seal 32, the tubular member 30 and the communication cables 60 and 62. The friction materials 25 and 26 do not have to bond with the communication cables 25 and 26 and/or the end seal 32 but have to assist in positioning the sizing tape 20 with respect to the communication cables 60 and 62 and/or the end seal 32 when assembling the unit comprising the tubular member 30, the communication cables 60 and 62 and the end seal 32. The friction materials 25 and 26 and resist movement thereby making it easier to assemble the cables 60 and 62 in the splice case. With respect to the cables 60 and 62 the friction materials 25 and 26 assist in positioning the sizing tape 20 with respect to the cables 60 and 62 while assembling the cables 25 and 26 in the end seals 32.

Some suitable materials for the base 24 may be neoprene, EPDM or vinyl nitrile. The base 24 should have a thickness in the range of 0.035 inches to 0.045 inches. The base should be elastic; conformable to the configuration of another object with which it may be associated; resistant to ultraviolet light, ozone, fuel oils, moisture, and weather of various types. The sizing tape or base 90 should have a shore A hardness in the range of 60 to 80.

Figure 9:
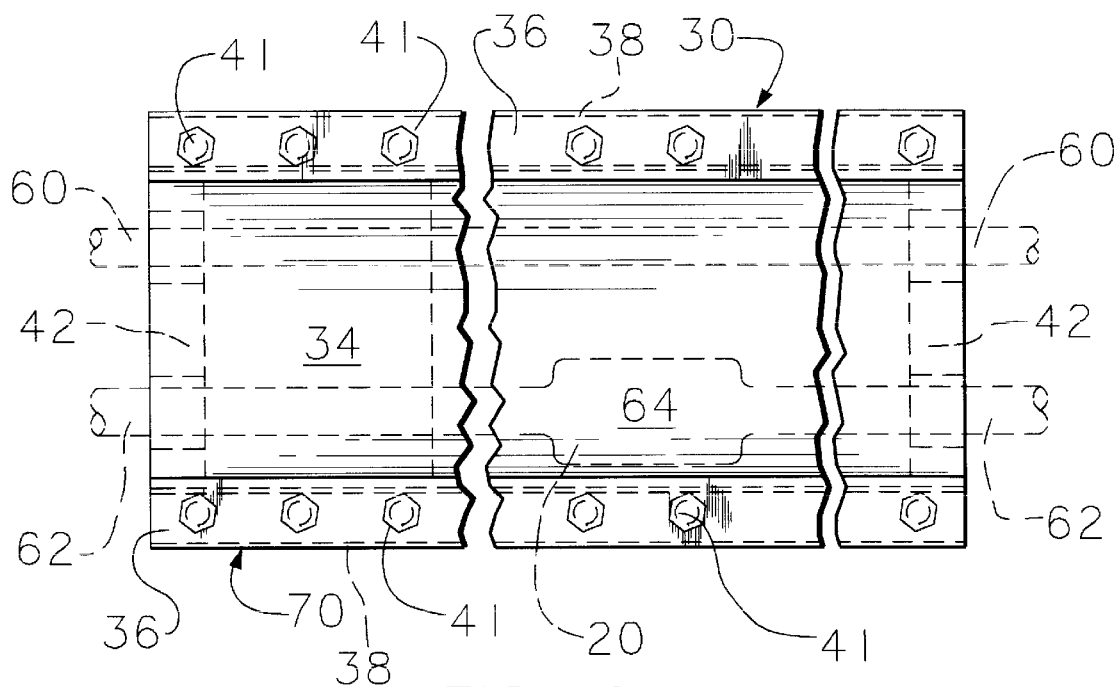
FIG. 9 is a fragmentary side elevational view of a splice case illustrating in phantom line a communication cable with a splice and sizing tape around the splice.

With respect to FIG. 9 assume that the communication cable 62 has been damaged. It is necessary to repair this cable. A splice is made at 64 joining together the damaged parts of the communication cable 62. It is necessary to protect the splice 64 from rain, snow, hail, freezing weather, a combination of rain and freezing weather, heat, and high temperatures, ultraviolet light from the sun, from mechanical stress due to swaying of the cable and the wind blowing against the communication cable, fuel resistant to material such as gasoline, diesel, oil, and kerosene, flame resistant to low temperature flame, and must be resistant to the internal air pressure inside of the cable as the internal pressure inside of the cable is about ten pounds per square inch. After the splice 64 has been made the splice case 70 must be positioned around the splice 64.

The tubular member 30 is positioned around the splice 64 and the cables 60 and 62. The two half tubular members 34 and end seal 32 are positioned around the cables 60 and 62, see FIGS. 6 and 7. The sizing tape 20 is wrapped around the cable 60 and also wrapped around the cable 62. The end seal 32 is cut along the appropriate concentric phantom lines 48 so as to make an opening for receiving the cable 60 and also for receiving the cable 62. The sizing tape 20 around the cable 60 and around the cable 62 makes the diameter a little bit larger than the opening 66 or the opening 68 in the half tubular end seal members 42.

The two half tubular members 42 of the end seal can be pressed against the sizing tape 20 surrounding the communication cable 60 and also surrounding the communication cable 62. As the diameter of the sizing tape surrounding the cable 60 and also the diameter of the sizing tape surrounding the cable 62 is larger than the openings 66 and 68 the two half tubular end seal members 42 have to be squeezed against the sizing tape 20. The friction material 25 or 26 on the first surface 27 of the sizing tape 20 assists in positioning the cable and the sizing tape with respect to the half tubular end seal members 42. The half tubular members 42 are squeezed together around the sizing tape surrounding the cable 60 and also around the sizing tape surrounding the cable 62. Then, sizing tape 20 is wrapped securely around the circumference of the end seal 32 comprising the two half tubular members 30. The friction material 26 on the first surface of the sizing tape 20 assists in positioning the sizing tape around the circumference of the end seal 32.

Figure 6:
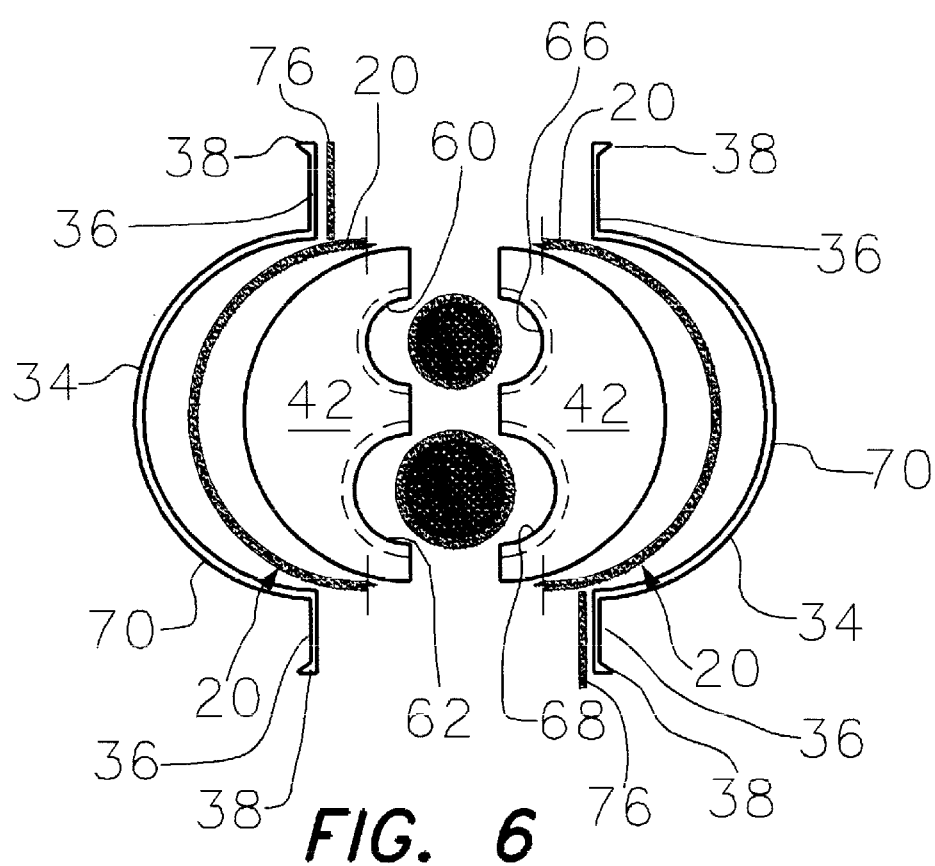
FIG. 6 is an end view illustrating the two half shells of the end seal separated for receiving two different size communication cables with the sizing tape around each communication cable.

In FIG. 6 it is seen that the communication cables 60 and 62 have been wrapped with the sizing tape 20 so as to have a larger diameter than the diameter of the openings 66 and 68 in the half tubular member 42 of the end seal 32.

In FIG. 7 it is seen that the two half tubular members 42 have been pressed together so that the sizing tape 20 overlaps the openings 66 and 68 in the end seal 32 or bulges to cover the openings 66 and 68. Also, it is seen that the sizing tape 20 has been wrapped around the circumference or periphery of the end seal 32. Then, the half tubular members 34 of the tubular member 30 have been squeezed together so as to fit over the sizing tape 20 on the circumference of the end seal 32. Again the sizing tape outside of tubular member bulges outwardly so as to hide the end of the tubular member 30 and to hide periphery of the end seal 32. A piece of sealant 76 or a strip of sealant 76 can be pressed between the two flanges 36 of the two half tubular members 34 of the tubular member 30. This is illustrated in FIG. 7. A nut and bolt combination 41 can be used for joining together the flanges 36 of the half tubular members 34 and with the sizing tape 20 between the flanges 36 for sealing purposes. Again, the sizing tape 20 around the circumference of the end seal 32 bulges out around the half tubular members 34 of the tubular member 30. This is illustrated in FIG. 7.

Figure 13:
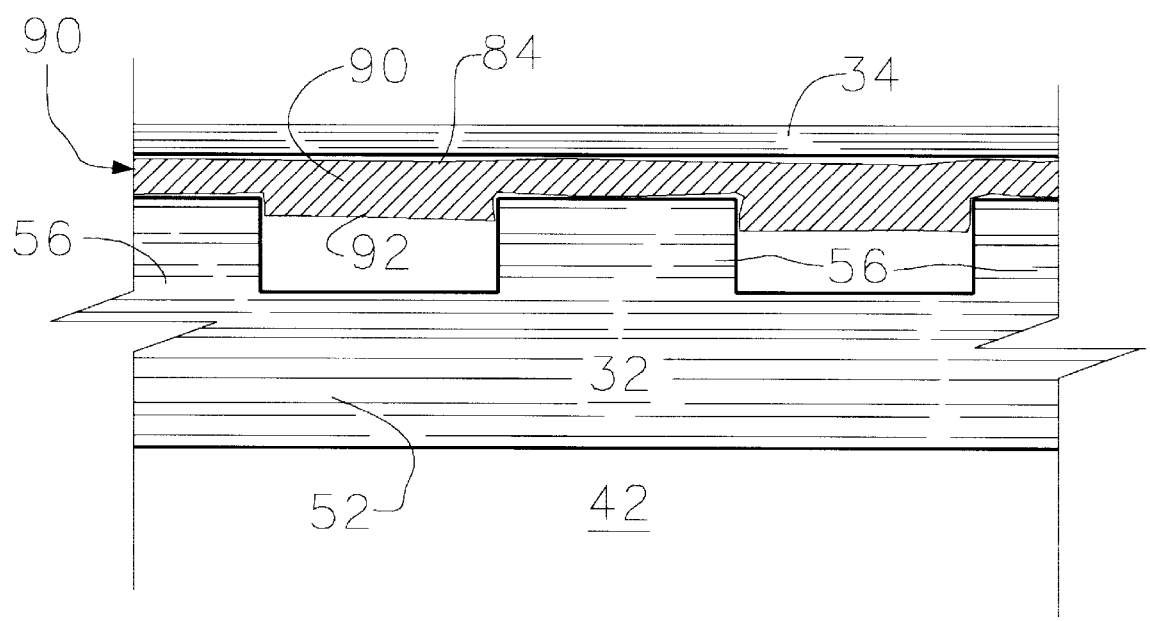
FIG. 13 is a fragmentary cross-sectional exploded view of the sizing tape positioned on the circumferential periphery of an end seal with some of the sizing tape in the recesses between the ridges on the periphery of the end seal.

In FIG. 13, on an enlarged scale, in a fragmentary part, is illustrated the circumference of the end seal 32 with peripheral ridges 56. The sizing tape 90 is positioned so that the first surface 92 is against the outer surface of the end seal 32, and the sizing tape 90 is sometimes contacting away from the circumference of the end seal 32. The tubular member 30 is pressing against the second surface 94 of the sizing tape 24 so as to force part of the sizing tape 24 into the recesses between the peripheral ridges 56. In this manner with the sizing tape 24 in the recesses between the peripheral ridges 56 the end seal 32 is securely positioned in the tubular member 30 composed of the two half tubular members 34. Again, this is illustrated in FIG. 13 on a fragmentary enlarged scale. In this manner the tubular member 30 and the end seal 32 are definitely positioned with respect to each other so as to be able to withstand wind pulling them apart and also to preclude the entrance of water and extraneous material into the splice case.

The tight fit between the sizing tape 20 on the circumference of the communication cable 60 and the recess 66 and also on the sizing tape 20 of the communication cable 62 in the recess 68 ensures the definite positioning of the cables 60 and 62 in the end 32. Further, the tight fit between the sizing tape 20 on the circumference of the end seal 32 and the interior surface of the tubular member 30 ensures the definite positioning of the communication cables 60 and 62 and the end seal 32 within the tubular member 30 or within the splice case 30.

To repeat, the sizing tape 20, in one species, comprises a base material having a first surface 27 and a second surface 28. On the first surface 27 there is a friction material 25 or 26 which is dry and cured neoprene. The liquid friction material is imbedded into the first surface 27 and bonds with the first surface 27. As the friction material is dry and cured the friction material 25 and 26 does not bond to the second surface 28. Therefore, it is possible to make the sizing tape 20 into a roll, see FIG. 1. The length of sizing tape 20 required for sealing purposes can be determined and the roll extended and the sizing tape 20 removed or cut from the roll. An advantage of the invention is that the sizing tape 20 comprises two materials, i.e., a base and a friction material. The sizing tapes known to the applicant and discussed in this patent application comprise three materials such as a base and an adhesive and a cover for the adhesive to prevent the adhesive sticking to the second surface of the sizing tape. The use of three materials is generally more expensive than the use of two materials. Therefore, there is advantage in using the sizing tape of the subject invention comprising two materials and which two material are not sticky adhesive.

A further advantage is it is not necessary for a repairman to work with messy adhesives and which adhesives stick to fingers, gloves, clothes, and parts of the splice case and make it difficult to do a neat job repairing the splice cable and applying the splice case around the splice of the cable.

The sizing tape 20 is inexpensive from the standpoint that sizing tape 20 is made from two commercially available materials as contrasted with commercially available sizing tape made from three commercially available materials. In this regard there is an advantage in the subject sizing tape 20.

In FIG. 4 it is seen that the half tubular member 42 has a number of circular indentations or passageways 74. These passageways 74 serve two purposes. One is that in the molding of the half tubular member 42 there is a large volume of plastic. In order to prevent the plastic from curing away from and shrinking away from the mold and possibly cracking there are pins in the molds. These pins leave indentations 74 which decrease the actual volume of plastic employed. The indentations 74 also serve the purpose of acting as additional gripping means for the sizing tape 20. As is recalled, the sizing tape 20 is a yieldable material and may be of neoprene or other suitable materials as described in the foregoing part of this specification. The sizing tape 24 will flow to a degree into the indentations 74 so as to more firmly position the end seal 32 with respect to the splice case 30.

The sealant 76 is silicone having a shore A durometer in the range of 40 to 90. The thickness of the sealant is 0.100 inches to 0.125 inches. The silicone sealant is resistant to oxidation, corona, radiation, ozone, and weathering such as resistance to water. Of many suitable silicones there can be used dimethyl polysiloxane or dimethyl silicone and phenyl silicone.

Figure 12:
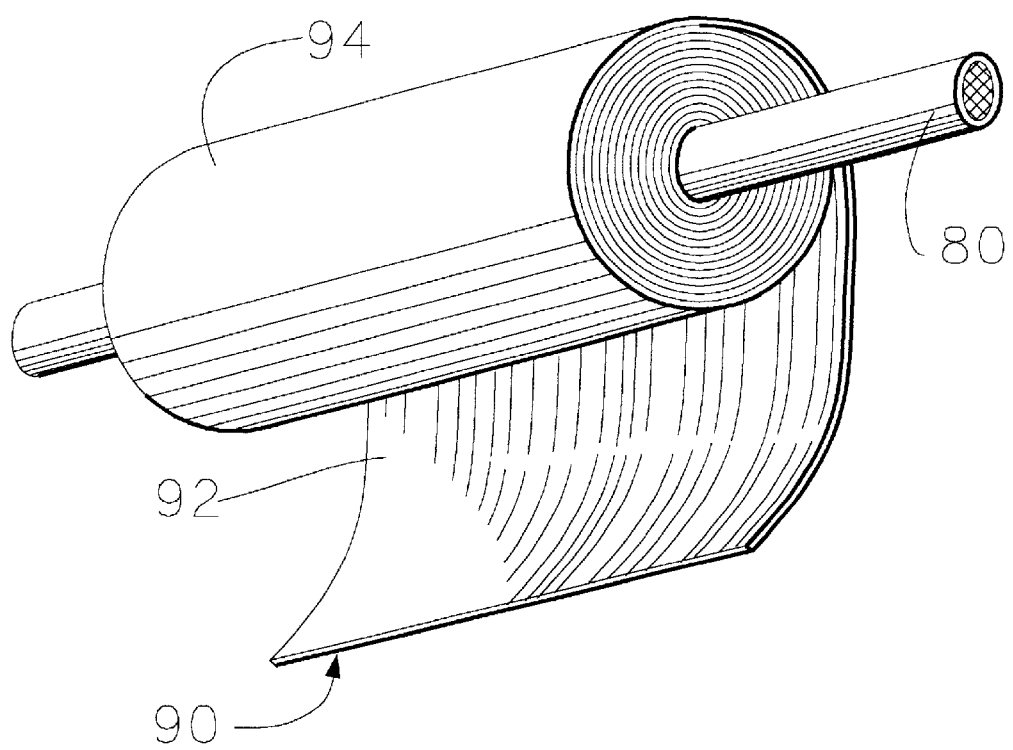
FIG. 12 is a perspective view of a roll of sizing tape showing the flexible weather resistance material free of material on both surfaces.

In another species, see FIG. 12, the sizing tape may be a sheet of material 90 of neoprene, EPDM or vinyl nitrile to name a few appropriate materials having a first surface 92 and a second surface 94. The material 90 should have a thickness in the range of 0.035 inches to 0.045 inches.

A sizing tape comprising a base having a first surface and a second surface; a friction material bonded to said first surface and integral with said base; and said friction material not being bonded to said second surface and not being integral with said second surface so as to allow said sizing tape to be formed into a roll which can be unwound. A sizing tape comprising a base having a first surface and a second surface; a friction material bonded to said first surface and integral with said base; said friction material not being bonded to said second surface and not being integral with said second surface so as to allow said sizing tape to be formed into a roll which can be unwound; said base being flexible and yieldable so as to be able to conform to the configuration of the article on which it is associated; and said sizing tape being resistant to rain, snow, hail, cold and freezing temperatures, ultraviolet light, hydrocarbons such as gasoline, diesel, oil and kerosene, and flame resistant to low temperature flame.

A sizing tape comprising a base having a firsrt suerface and a second surface; a friction material bonded to said first surface and integral with said base; said friction material not being bonded to said second surface and not being integral with said second surface so as to allow said sizing tape to be formed into a roll which can be unwound; said base being flexible and yieldable so as to be able to conform to the configuration of the article on which it is associated; said sizing tape being resistant to rain, snow, hail, cold and freezing tempeatures, ultraviolet light, hydrocarbons such as gasoline, diesel, oil and kerosene, and flame resistant to low temperature flame; and said friction material being in at least two strips on said first surface and the distance bedtween the two strips being at least two times the width of said strip.

A sizing tape comprising a base having a first surface and a second surface; a friction material bonded to said first surface and integral with said base; said friction material not being bonded to said second surface and not being integral with said second surface so as to allow said sizing tape to be formed into a roll which can be unwound; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; and said friction material being in at least two strips on said first surface and the distance between the two strips being at least two times the width of said strip.

A sizing tape comprising a base having a first surface and a second surface; a friction material bonded to said first surface and integral with said base; said friction material not being bonded to said second surface and not being integral with said second surface so as to allow said sizing tape to be formed into a roll which can be unwound; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; and said friction material being in splotches on said first surface and said splotches occupying less than one-third of the surface area of said first surface.

A sizing tape comprising a base having a first surface and a second surface; a friction material bonded to said first surface and integral with said base; said friction material not being bonded to said second surface and not being integral with said second surface so as to allow said sizing tape to be formed into a roll which can be unwound; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; said friction material being in at least two strips on said first surface and the distance between the two strips being at least two times the width of said strip; said base having a thickness in the range of 0.035 inches to 0.045 inches; and a shore A hardness in the range of 60 to 80.

A sizing tape comprising a base having a first surface and a second surface; a friction material bonded to said first surface and integral with said base; said friction material not being bonded to said second surface and not being integral with said second surface so as to allow said sizing tape to be formed into a roll which can be unwound; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; said friction material being in splotches on said first surface and said splotches occupying less than one-third of the surface area of said first surface; said base having a thickness in the range of 0.035 inches to 0.045 inches; and a shore A hardness in the range of 60 to 80.

A process for making a sizing tape and comprising selecting a base having a first surface and a second surface; bonding a friction material to said first surface and making said friction material integral with said base; and said friction material does not adhere to said second surface and is not integral with said second surface so as to allow said sizing tape to be formed into a roll which can be unwound.

A process for making a sizing tape and comprising selecting a base having a first surface and a second surface; bonding a friction material to said first surface and making said friction material integral with said base; said friction material does not adhere to said second surface and is not integral with said second surface so as to allow said sizing tape to be formed into a roll which can be unwound; selecting a flexible and yieldable base capable of conforming to the configuration of the article on which it is associated; and selecting said sizing tape to be resistant to rain, snow, hail, cold and freezing temperatures, ultraviolet light, hydrocarbons such as gasoline, diesel, oil and kerosene, and flame resistant to low temperature flame.

A process for making a sizing tape and comprising selecting a base having a first surface and a second surface; bonding a friction material to said first surface and making said friction material integral with said base; said friction material does not adhere to said second surface and is not integral with said second surface so as to allow said sizing tape to be formed into a roll which can be unwound; selecting a flexible and yieldable base capable of conforming to the configuration of the article on which it is associated; selecting said sizing tape to be resistant to rain, snow, hail, cold and freezing temperatures, ultraviolet light, hydrocarbons such as gasoline, diesel, oil and kerosene, and flame resistant to low temperature flame; and positioning said friction material on said first-surface and in at least two strips with the distance between the two strips being at least two times the width of said strip.

A process for making a sizing tape and comprising selecting a base having a first surface and a second surface; bonding a friction material to said first surface and making said friction material integral with said base; said friction material does not adhere to said second surface and is not integral with said second surface so as to allow said sizing tape to be formed into a roll which can be unwound; selecting a flexible and yieldable base capable of conforming to the configuration of the article on which it is associated; selecting said sizing tape to be resistant to rain, snow, hail, cold and freezing temperatures, ultraviolet light, hydrocarbons such as gasoline, diesel, oil and kerosene, and flame resistant to low temperature flame; and positioning said friction material in splotches on said first surface with said splotches occupying less than one-third the surface area of said first surface.

A process for making a sizing tape and comprising selecting a base having a first surface and a second surface; bonding a friction material to said first surface and making said friction material integral with said base; said friction material does not adhere to said second surface and is not integral with said second surface so as to allow said sizing tape to be formed into a roll which can be unwound; selecting a flexible and yieldable base capable of conforming to the configuration of the article on which it is associated; selecting said sizing tape to be resistant to rain, snow, hail, cold and freezing temperatures, ultraviolet light, hydrocarbons such as gasoline, diesel, oil and kerosene, and flame resistant to low temperature flame; positioning said friction material on said first surface and in at least two strips with the distance between the two strips being at least two times the width of said strip; and selecting said base to have a thickness in the range of 0.035 inches to 0.045 inches and a shore A hardness in the range A process for making a sizing tape and comprising selecting a base having a first surface and a second surface; bonding a friction material to said first surface and making said friction material integral with said base; said friction material does not adhere to said second surface and is not integral with said second surface so as to allow said sizing tape to be formed into a roll which can be unwound; selecting a flexible and yieldable base capable of conforming to the configuration of the article on which it is associated; selecting said sizing tape to be resistant to rain, snow, hail, cold and freezing temperatures, ultraviolet light, hydrocarbons such as gasoline, diesel, oil and kerosene, and flame resistant to low temperature flame; and selecting said base to have a thickness in the range of 0.035 inches to 0.045 inches and a shore A hardness in the range of 60 to 80.

A sizing tape made by a process comprising selecting a base having a first surface and a second surface; bonding a friction material to said first surface and making said friction material integral with said base; and said friction material does not adhere to said second surface and is not integral with said second surface so as to allow said sizing tape to be formed into a roll which can be unwound.

A sizing tape made by a process comprising selecting a base having a first surface and a second surface; bonding a friction material to said first surface and making said friction material integral with said base; said friction material does not adhere to said second surface and is not integral with said second surface so as to allow said sizing tape to be formed into a roll which can be unwound; selecting a flexible and yieldable base capable of conforming to the configuration of the article on which it is associated; and selecting said sizing to be resistant to rain, snow, hail, cold and freezing temperatures, ultraviolet light, hydrocarbons such as gasoline, diesel, oil and kerosene, and flame resistant to low temperature flame.

A sizing tape made by a process comprising selecting a base having a first surface and a second surface; bonding a friction material to said first surface and making said friction material integral with said base; said friction material does not adhere to said second surface and is not integral with said second surface so as to allow said sizing tape to be formed into a roll which can be unwound; selecting a flexible and yieldable base capable of conforming to the configuration of the article on which it is associated; selecting said sizing to be resistant to rain, snow, hail, cold and freezing temperatures, ultraviolet light, hydrocarbons such as gasoline, diesel, oil and kerosene, and flame resistant to low temperature flame; and positioning said friction material on said first surface and in at least two strips with the distance between the two strips being at least two times the width of said strip.

A sizing tape made by a process comprising selecting a base having a first surface and a second surface; bonding a friction material to said first surface and making said friction material integral with said base; said friction material does not adhere to said second surface and is not integral with said second surface so as to allow said sizing tape to be formed into a roll which can be unwound; selecting a flexible and yieldable base capable of conforming to the configuration of the article on which it is associated; selecting said sizing to be resistant to rain, snow, hail, cold and freezing temperatures, ultraviolet light, hydrocarbons such as gasoline, diesel, oil and kerosene, and flame resistant to low temperature flame; and positioning said friction material in splotches on said first surface with said splotches occupying less than one-third the surface area of said first surface.

A sizing tape made by a process comprising selecting a base having a first surface and a second surface; bonding a friction material to said first surface and making said friction material integral with said base; said friction material does not adhere to said second surface and is not integral with said second surface so as to allow said sizing tape to be formed into a roll which can be unwound; selecting a flexible and yieldable base capable of conforming to the configuration of the article on which it is associated; selecting said sizing to be resistant to rain, snow, hail, cold and freezing temperatures, ultraviolet light, hydrocarbons such as gasoline, diesel, oil and kerosene, and flame resistant to low temperature flame; positioning said friction material on said first surface and in at least two strips with the distance between the two strips being at least two times the width of said strip; and selecting said base to have a thickness in the range of 0.035 inches to 0.045 inches and a shore A hardness in the range of 60 to 80.

A sizing tape made by a process comprising selecting a base having a first surface and a second surface; bonding a friction material to said first surface and making said friction material integral with said base; said friction material does not adhere to said second surface and is not integral with said second surface so as to allow said sizing tape to be formed into a roll which can be unwound; selecting a flexible and yieldable base capable of conforming to the configuration of the article on which it is associated; selecting said sizing to be resistant to rain, snow, hail, cold and freezing temperatures, ultraviolet light, hydrocarbons such as gasoline, diesel, oil and kerosene, and flame resistant to low temperature flame; positioning said friction material in splotches on said first surface with said splotches occupying less than one-third the surface area of said first surface; selecting said base to have a thickness in the range of 0.035 inches to 0.045 inches and a shore A hardness in the range of 60 to 80.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; and said enlarged cable being in said aligned passageways in said two mating half tubular members.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; said base being flexible and yieldable so as to be able to conform to the configuration of the article on which it is associated; and said sizing tape being resistant to rain, snow, hail, cold and freezing temperatures, ultraviolet light, hydrocarbons such as gasoline, diesel, oil and kerosene, and flame resistant to low temperature flame.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; and said friction material being in at least two strips and the distance between the two strips being at least two times the width of said strip.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; and said friction material being in splotches on said first surface and said splotches occupying less than one-third of the surface area of said first surface.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; said friction material being in at least two strips and the distance between the two strips being at least two times the width of said strip; said base having a thickness in the range of 0.035 inches to 0.045 inches; and a shore A hardness in the range of 60 to 80.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; said friction material being in splotches on said first surface and said splotches occupying less than one-third of the surface area of said first surface; said base having a thickness in the range of 0.035 inches to 0.045 inches; and a shore A hardness in the range of 60 to 80.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; and the diameter of said enlarged cable being larger than the diameter of said aligned passageways so that the diameter of said enlarged cable outside of said aligned passageways is larger than the diameter of said enlarged cable in said passageways.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; and means to unite said first half tubular member and said second half tubular member to encompass said first end seal and aid second end seal and said communication cable.

A combination of a communication cable, an end seal and sizing tape, and comprising the cable comprises a number of individual information transmitting members; the end seal comprises two mating half tubular members; each half tubular member has two spaced apart end walls widentified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; and said sizing tape being resistant to rain, snow, hail, cold and freezing temperatures, ultraviolet light, hydrocarbons such as gasoline, diesel, oil and kerosene, and flame resistant to low temperature flame.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; and said friction material being in at least two strips and the distance between said two strips being at least two times the width of said strip.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; and said friction material being in splotches on said first surface and said splotches occupying less than one-third of the surface area of said first surface.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; said friction material being in at least two strips and the distance between said two strips being at least two times the width of said strip; said base having a thickness in the range of 0.035 inches to 0.045 inches; and a shore A hardness in the range of 60 to 80.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; said friction material being in splotches on said first surface and said splotches occupying less than one-third of the surface area of said first surface; said base having a thickness in the range of 0.035 inches to 0.045 inches; and a shore A hardness in the range of 60 to 80.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; said friction material being in at least two strips and the distance between said two strips being at least two times the width of said strip; said base having a thickness in the range of 0.035 inches to 0.045 inches; a shore A hardness in the range of 60 to 80; the diameter of said enlarged cable being larger than the diameter of said aligned passageways so that the diameter of said enlarged cable outside of said aligned passageways is larger than the diameter of said enlarged cable in said passageways.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; said friction material being in splotches on said first surface and said splotches occupying less than one-third of the surface area of said first surface; said base having a thickness in the range of 0.035 inches to 0.045 inches; a shore A hardness in the range of 60 to 80; and the diameter of said enlarged cable being larger than the diameter of said aligned passageways so that the diameter of said enlarged cable outside of said aligned passageways is larger than the diameter of said enlarged cable in said aligned passageways.

A process for making a combination of a communication cable, an end seal and sizing tape, said process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; and wrapping said sizing tape around said cable so that the exterior second surface of the cable is a larger diameter than the diameter of said aligned passageways so that the end seals must be forced together to accommodate the cable and sizing tape combination.

A process for making a combination of a communication cable, an end seal and sizing tape, said process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; selecting a flexible and yieldable base capable of conforming to the configuration of the article on which it is associated; and selecting said sizing tape to be resistant to rain, snow, hail, cold and freezing temperatures, ultraviolet light, hydrocarbons such as gasoline, diesel, oil and kerosene, and flame resistant to low temperature flame.

A process for making a combination of a communication cable, an end seal and sizing tape, said process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; selecting a flexible and yieldable base capable of conforming to the configuration of the article on which it is associated; and selecting said sizing tape to be resistant to rain, snow, hail, cold and freezing temperatures, ultraviolet light, hydrocarbons such as gasoline, diesel, oil and kerosene, and flame resistant to low temperature flame.

A process for making a combination of a communication cable, an end seal and sizing tape, said process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; selecting a flexible and yieldable base capable of conforming to the configuration of the article on which it is associated; selecting said sizing tape to be resistant to rain, snow, hail, cold and freezing temperatures, ultraviolet light, hydrocarbons such as gasoline, diesel, oil and kerosene, and flame resistant to low temperature flame; and positioning said friction material on said first surface and in at least two strips with the distance between the two strips being at least two times the width of said strip.

A process for making a combination of a communication cable, an end seal and sizing tape, said process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; selecting a flexible and yieldable base capable of conforming to the configuration of the article on which it is associated; selecting said sizing tape to be resistant to rain, snow, hail, cold and freezing temperatures, ultraviolet light, hydrocarbons such as gasoline, diesel, oil and kerosene, and flame resistant to low temperature flame; positioning said friction material in splotches on said first surface and with said splotches occupying less than one-third of the surface area of said first surface; and selecting said base to have a thickness in the range of 0.035 inches to 0.045 inches and a shore A hardness in the range of 60 to 80.

A process for making a combination of a communication cable, an end seal and sizing tape, said process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; selecting a flexible and yieldable base capable of conforming to the configuration of the article on which it is associated; selecting said sizing tape to be resistant to rain, snow, hail, cold and freezing temperatures, ultraviolet light, hydrocarbons such as gasoline, diesel, oil and kerosene, and flame resistant to low temperature flame; and positioning said friction material on said first surface and in at least two strips with the distance between the two strips being at least two times the width of said strip; and selecting said base to have a thickness in the range of 0.035 inches to 0.045 inches and a shore A hardness in the range of 60 to 80.

A process for making a combination of a communication cable, an end seal and sizing tape, said process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; and the diameter of said enlarged cable being larger than the diameter of said aligned passageways so that the diameter of said enlarged cable outside of aligned passageways is larger than the diameter of said enlarged cable in said passageways.

A process for making a combination of a communication cable, an end seal and sizing tape, said process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; and means to unite said first half tubular member and said second half tubular member to encompass said first end seal and said second end seal and said communication cable.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; selecting a flexible and yieldable base so as to be able to conform to the configuration of the article on which it is associated; and selecting said sizing tape to be resistang to rain, snow, hail, cold and freezing temperatures, ultraviolet light, hydrocarbons such as gasoline, diesel, oil and kerosene, and flame resistant to low temperature flame.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; selecting a flexible and yieldable base so as to be able to conform to the configuration of the article on which it is associated; selecting said sizing tape to be resistang to rain, snow, hail, cold and freezing temperatures, ultraviolet light, hydrocarbons such as gasoline, diesel, oil and kerosene, and flame resistant to low temperature flame; and positioning said friction material in at least two strips with the distance between the two strips to be at least two times the width of said strip.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; selecting a flexible and yieldable base so as to be able to conform to the configuration of the article on which it is associated; selecting said sizing tape to be resistang to rain, snow, hail, cold and freezing temperatures, ultraviolet light, hydrocarbons such as gasoline, diesel, oil and kerosene, and flame resistant to low temperature flame; and selecting said friction material to be in splotches on said first surface with said splotches occupying less than one-third of the surface area of said first surface.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; selecting a flexible and yieldable base so as to be able to conform to the configuration of the article on which it is associated; selecting said sizing tape to be resistang to rain, snow, hail, cold and freezing temperatures, ultraviolet light, hydrocarbons such as gasoline, diesel, oil and kerosene, and flame resistant to low temperature flame; positioning said friction material in at least two strips with the distance between the two strips to be at least two times the width of said strip; selecting said base to have a thickness in the range of 0.035 inches to 0.035 inches to 0.045 inches; and a shore A hardness in the range of 60 to 80.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; selecting a flexible and yieldable base so as to be able to conform to the configuration of the article on which it is associated; selecting said sizing tape to be resistang to rain, snow, hail, cold and freezing temperatures, ultraviolet light, hydrocarbons such as gasoline, diesel, oil and kerosene, and flame resistant to low temperature flame; selecting said friction material to be in splotches on said first surface with said splotches occupying less than one-third of the surface area of said first surface; selecting said base to have a thickness in the range of 0.35 inches to 0.035 inches to 0.045 inches; and a shore A hardness in the range of 60 to 80.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; selecting a flexible and yieldable base so as to be able to conform to the configuration of the article on which it is associated; selecting said sizing tape to be resistang to rain, snow, hail, cold and freezing temperatures, ultraviolet light, hydrocarbons such as gasoline, diesel, oil and kerosene, and flame resistant to low temperature flame; positioning said friction material in at least two strips with the distance between the two strips to be at least two times the width of said strip; selecting said base to have a thickness in the range of 0.35 inches to 0.035 inches to 0.045 inches; a shore A hardness in the range of 60 to 80; and making the diameter of said enlarged cable larger than the diameter of said aligned passageway so that the diameter of said enlarged cable outside of said aligned passageway is larger than the diameter of said cable in said aligned passageways.

A combination of a communication cable, an end seal and sizing tape, and comprising the cable comprises a number of individual information transmitting members; the end seal comprises two mating half tubular members; each half tubular member has two spaced apart end walls identified as a first end wall and a second end wall and a circumferential outside wall defining a hollow interior and presenting in a lateral cross-sectional view a semicircular cylindrical configuration; aligned passageways in said first end wall and in said second end wall of each tubular member; aligned passageways in said two mating half tubular members; said sizing tape comprising: a base having a first surface and a second surface; a friction material bonded to said first surface and integral with said base; said friction material not being bonded to said second surface and not being integral with said second surface so as to allow said sizing tape to be formed into a roll which can be unwound; said sizing tape encircling said cable and wrapped around said cable forming an enlarged cable; said enlarged cable being in said aligned passageways in said two mating half tubular members; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and aid second end seal and said communication cable; said base being flexible and yieldable so as to be able to conform to the configuration of the article on which it is associated; said sizing tape being resistant to rain, snow, hail, cold and freezing temperatures, ultraviolet light, hydrocarbons such as gasoline, diesel, oil and kerosene, and flame resistant to low temperature flame; selecting a flexible and yieldable base so as to be able to conform to the configuration of the article on which it is associated; selecting said sizing tape to be resistang to rain, snow, hail, cold and freezing temperatures, ultraviolet light, hydrocarbons such as gasoline, diesel, oil and kerosene, and flame resistant to low temperature flame; selecting said friction material to be in splotches on said first surface with said splotches occupying less than one-third of the surface area of said first surface; selecting said base to have a thickness in the range of 0.35 inches to 0.035 inches to 0.045 inches; a shore A hardness in the range of 60 to 80; and making the diameter of said enlarged cable larger than the diameter of said aligned passageway so that the diameter of said enlarged cable outside of said aligned passageway is larger than the diameter of said cable in said aligned passageways.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; and wrapping said sizing tape around said cable so that the exterior second surface of the cable is a larger diameter than the diameter of said aligned passageways so that the end seals must be forced together to accommodate the cable and sizing tape combination.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first send wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; selecting a flexible and yieldable base capable of conforming to the configuration of the article on which it is associated; and selecting said sizing tape to be resistant to rain, snow, hail, cold and freezing temperatures, ultraviolet light, hydrocarbons such as gasoline, diesel, oil and kerosene, and flame resistant to low temperature flame.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; selecting a flexible and yieldable base capable of conforming to the configuration of the article on which it is associated; selecting said sizing tape to be resistant to rain, snow, hail, cold and freezing temperatures, ultraviolet light, hydrocarbons such as gasoline, diesel, oil and kerosene, and flame resistant to low temperature flame; and positioning said friction material on said first surface and in at least two strips with the distance between the two strips being at least two times the width of said strip; and positioning said friction material in splotches on said first surface and with said splotches occupying less than one-third of the surface area of said first surface.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; selecting a flexible and yieldable base capable of conforming to the configuration of the article on which it is associated; selecting said sizing tape to be resistant to rain, snow, hail, cold and freezing temperatures, ultraviolet light, hydrocarbons such as gasoline, diesel, oil and kerosene, and flame resistant to low temperature flame; and selecting said base to have a thickness in the range of 0.35 inches to 0.045 inches and a shore A hardness in the range of 60 to 80.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; selecting a flexible and yieldable base capable of conforming to the configuration of the article on which it is associated; selecting said sizing tape to be resistant to rain, snow, hail, cold and freezing temperatures, ultraviolet light, hydrocarbons such as gasoline, diesel, oil and kerosene, and flame resistant to low temperature flame; and positioning said friction material on said first surface and in at least two strips with the distance between the two strips being at least two times the width of said strip; positioning said friction material in splotches on said first surface and with said splotches occupying less than one-third of the surface area of said first surface; and selecting said base to have a thickness in the range of 0.035 inches to 0.045 inches and a shore A hardness in the range of 60 to 80.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; and the diameter of said enlarged cable being larger than the diameter of said aligned passageways so that the diameter of said enlarged cable outside of aligned passageways is larger than the diameter of said enlarged cable in said passageways.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; and means to unite said first half tubular member and said second half tubular member to encompass said first end seal and said second end seal and said communication cable.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and said second end seal and said communication cable; selecting a flexible and yieldable base so as to be able to conform to the configuration of the article on which it is associated; and selecting said sizing tape to be resistang to rain, snow, hail, cold and freezing temperatures, ultraviolet light, hydrocarbons such as gasoline, diesel, oil and kerosene, and flame resistant to low temperature flame.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and said second end seal and said communication cable; selecting a flexible and yieldable base so as to be able to conform to the configuration of the article on which it is associated; selecting said sizing tape to be resistang to rain, snow, hail, cold and freezing temperatures, ultraviolet light, hydrocarbons such as gasoline, diesel, oil and kerosene, and flame resistant to low temperature flame; and positioning said friction material in at least two strips with the distance between the two strips to be at least two times the width of said strip.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and said second end seal and said communication cable; selecting a flexible and yieldable base so as to be able to conform to the configuration of the article on which it is associated; selecting said sizing tape to be resistang to rain, snow, hail, cold and freezing temperatures, ultraviolet light, hydrocarbons such as gasoline, diesel, oil and kerosene, and flame resistant to low temperature flame; and selecting said friction material to be in splotches on said first surface with said splotches occupying less than one-third of the surface area of said first surface.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and said second end seal and said communication cable; selecting a flexible and yieldable base so as to be able to conform to the configuration of the article on which it is associated; selecting said sizing tape to be resistang to rain, snow, hail, cold and freezing temperatures, ultraviolet light, hydrocarbons such as gasoline, diesel, oil and kerosene, and flame resistant to low temperature flame; positioning said friction material in at least two strips with the distance between the two strips to be at least two times the width of said strip; selecting said base to have a thickness in the range of 0.35 inches to 0.035 inches to 0.045 inches; and a shore A hardness in the range of 60 to 80.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and said second end seal and said communication cable; selecting a flexible and yieldable base so as to be able to conform to the configuration of the article on which it is associated; selecting said sizing tape to be resistang to rain, snow, hail, cold and freezing temperatures, ultraviolet light, hydrocarbons such as gasoline, diesel, oil and kerosene, and flame resistant to low temperature flame; selecting said friction material to be in splotches on said first surface with said splotches occupying less than one-third of the surface area of said first surface; selecting said base to have a thickness in the range of 0.35 inches to 0.035 inches to 0.045 inches; and a shore A hardness in the range of 60 to 80.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and said second end seal and said communication cable; selecting a flexible and yieldable base so as to be able to conform to the configuration of the article on which it is associated; selecting said sizing tape to be resistang to rain, snow, hail, cold and freezing temperatures, ultraviolet light, hydrocarbons such as gasoline, diesel, oil and kerosene, and flame resistant to low temperature flame; positioning said friction material in at least two strips with the distance between the two strips to be at least two times the width of said strip; selecting said base to have a thickness in the range of 0.35 inches to 0.035 inches to 0.045 inches; a shore A hardness in the range of 60 to 80; and making the diameter of said enlarged cable larger than the diameter of said aligned passageway so that the diameter of said enlarged cable outside of said aligned passageway is larger than the diameter of said cable in said aligned passageways.

A combination of a communication cable, an end seal, and sizing tape made by a process comprising selecting a cable comprising a number of individual information transmitting members; selecting an end seal comprising two mating half tubular members with each half tubular member having two spaced apart end walls identified as a first end wall and a second end wall and a circumferential outside wall defining a hollow interior and presenting in a lateral cross-sectional view a semicircular cylindrical configuration and having aligned passageways in said first end wall and in said second end wall of each tubular member and having aligned passageways in said two mating half tubular members; in making said sizing tape selecting a base having a first surface and a second surface; bonding a friction material to said first surface and making said friction material integral with said base; said friction material does not adhere to said second surface and is not integral with said second surface so as to allow said sizing tape to be formed into a roll which roll can be unwound; wrapping said sizing tape around said cable so that the exterior second surface of the cable is a larger diameter than the diameter of said aligned passageways so that the end seals must be forced together to accommodate the cable and sizing tape combination; enlarging said combination to include a splice case to having a first half tubular member and a second half tubular member; said first half tubular member and said second half tubular member in combination defining a tubular member; said tubular member having a first end and a second end; there being a first end seal and a second end seal; wrapping said sizing tape around the circumferential wall of said first end seal to have a first external diameter larger than the internal diameter of said first end so that said first external diameter outside of said first end is larger than said first external diameter inside of said first end; and wrapping said sizing tape around the circumferential wall of said second end seal to have a second external diameter larger than the internal diameter of said second end so that said second external diameter outside of said second end is larger than said second external diameter inside of said second end; means to unite said first half tubular member and said second half tubular member to encompass said first end seal and said second end seal and said communication cable; selecting a flexible and yieldable base so as to be able to conform to the configuration of the article on which it is associated; selecting said sizing tape to be resistang to rain, snow, hail, cold and freezing temperatures, ultraviolet light, hydrocarbons such as gasoline, diesel, oil and kerosene, and flame resistant to low temperature flame; selecting said friction material to be in splotches on said first surface with said splotches occupying less than one-third of the surface area of said first surface; selecting said base to have a thickness in the range of 0.35 inches to 0.035 inches to 0.045 inches; a shore A hardness in the range of 60 to 80; and making the diameter of said enlarged cable larger than the diameter of said aligned passageway so that the diameter of said enlarged cable outside of said aligned passageway is larger than the diameter of said cable in said aligned

I claim:

1. A sizing tape comprising:
   a. a base having a first surface and a second surface;
   b. said base being flexible and yieldable;
   c. a friction material bonded to said first surface and integral with said base;
   d. said friction material being free of said second surface and being free of integration with said second surface so as to allow said sizing tape to be formed into a roll which can be unwound; and,
   e. said sizing tape being resistant to rain, snow, hail, cold and freezing temperatures, ultraviolet light, hydrocarbons, gasoline, diesel, oil and kerosene, and flame resistant to low temperature flame.

2. A sizing tape according to claim 1 and comprising:
   a. said friction material being in at least two strips on said first surface and the distance between the two strips being at least two times the width of said strip.

3. A sizing tape according to claim 2 and comprising:
   a. said base having a thickness in the range of 0.035 inches to 0.045 inches;
   b. a shore A hardness in the range of 60 to 80;
   c. said base being neoprene; and
   d. said friction material being dry and cured neoprene.

4. A sizing tape according to claim 1 and comprising:
   a. said friction material being in splotches on said first surface and said splotches occupying less than one-third of the surface area of said first surface.

5. A sizing tape according to claim 1 and comprising:
   a. said base having a thickness in the range of 0.035 inches to 0.045 inches;
   b. a shore A hardness in the range of 60 to 80;
   c. said base being neoprene;
   d. said friction material being dry and cured neoprene.

6. A process for making a sizing tape and comprising:
   a. selecting a base having a first surface and a second surface;
   b. selecting said base to be flexible and yieldable;
   c. bonding a friction material to said first surface and making said friction material integral with said base;
   d. said friction material does not adhere to said second surface; and is not integral with said second surface so as to allow said sizing tape to be formed into a roll which can be unwound; and,
   e. selecting said sizing tape to be resistant to rain, snow, hail, cold and freezing temperatures ultraviolet light, hydrocarbons, gasoline, diesel, oil and kersene, and flame resistant to low temperature flame.

7. A process for making a sizing tape according to claim 6 and comprising positioning said friction material on said first surface and in at least two strips with the distance between the two strips being at least two times the width of said strip.

8. A process for making a sizing tape according to claim 6 and comprising positioning said friction material in splotches on said first surface with said splotches occupying less than one-third the surface area of said first surface.

9. A process for making a sizing tape according to claim 7 and comprising selecting said base to have a thickness in the range of 0.035 inches to 0.045 inches and a shore A hardness in the range of 60 to 80.

10. A process for making a sizing tape according to claim 8 and comprising selecting said base to have a thickness in the range of 0.035 inches to 0.045 inches and a shore A hardness in the range of 60 to 80.

11. A sizing tape made by a process comprising:
    a. selecting a base having a first surface and a second surface;
    b. bonding a friction material to said first surface and making said friction material integral with said base;
    c. selecting said friction material that does not adhere to said second surface and is not integral with said second surface so as to allow said sizing tape to be formed into a roll which which can be unwound;
    d. selecting a flexible and yieldable base; and,
    e. and selecting said sizing tape to be resistant to rain, snow, hail, cold and freezing temperatures, ultraviolet light, hydrocarbons, gasoline, diesel, oil and kerosene, and flame resistant to low temperature flame.

12. A sizing tape made by a process according to claim 11 and resistant to low temperature flame and positioning said friction material on said first surface and in at least two strips with the distance between the two strips being at least two times the width of said strip.

13. A sizing tape made by a process according to claim 12 and comprising selecting said base to have and selecting said base to have a thickness in the range of 0.035 inches to 0.045 inches and a Shore A hardness in the range of 60 to 80.

14. A sizing tape made by a process according to claim 11 and comprising positioning said friction material in splotches on said first surface with said splotches occupying less than one-third the surface area of said first surface.

15. A sizing tape made by a process according to claim 14 and comprising selecting said base to have a thickness in the range of 0.035 inches to 0.045 inches and a Shore A hardness in the range of 60 to 80.

16. A protective cover for a cable splice, said cover comprising:
    a. a cylindrical case comprising two semi-circular members identified as a first member and a second member;
    b. said first member having a first side and a first flange on said first side and a second side and and a second flange on said second side;
    c. said second member having a third side and a third flange on said third side and a fourth side and a fourth flange on said fourth side;
    d. means to unite said first flange and said third flange;
    e. means to unite said second flange and said fourth flange;
    f. a silicone sealant positioned between said first flange and said third flange;
    g. a silicone sealant positioned between said second flange and said fourth flange;
    h. said cylindrical case having two ends;
    i. end seals being inside of said cylindrical case and being positioned near respective ends of said cylindrical case;

j. each end seal being composed of two mating semi-circular members;
k. each member of each end seal having two semi-circular longitudinal cavities;
l. each end seal having end walls;
m. two of said members in mating relation defining two enclosed cylindrical longitudinal cavities;
n. a sizing tape comprising a base having a first surface and a second surface;
o. a dry friction material on said first surface and covering less than about one-third of said first surface;
p. said first surface and said friction material contacting said end seal and said second surface contacting the interior surface of said cylindrical case for ease of separation of said end seal and said cylindrical case; and
q. said silicone sealant having a Shore A durometer in the range of 40 to 90 and a thickness in the range of 0.100 inches to 0.125 inches.

17. A protective cover according to claim 16 and comprising:
a. said friction material being in at least two strips and the distance between the two strips being at least two time the width of said strip.

18. A protective cover according to claim 16 and comprising:
a. said friction material being in splotches on said first surface and said splotches occupying less than one-third surface are of said first surface.

19. A process for making a protective cover for a cable splice, said process comprising:
a. forming a cylindrical case comprising two semi-circular members identified as a first member and a second member;
b. forming said first member to have a first side and a first flange on said first side and a second side and and a second flange on said second side;
c. forming said second member to have a third side and a third flange on said third side and a fourth side and a fourth flange on said fourth side;
d. uniting said first flange and said third flange;
e. uniting said second flange and said fourth flange;
f. positioning a silicone sealant between said first flange and said third flange;
g. positioning a silicone sealant between said second flange and said fourth flange;
h. forming said cylindrical case with two ends;
i. positioning end seals inside of said cylindrical case and near respective ends of said cylindrical case;
j. forming each end seal of two mating semi-circular members;
k. forming each member of each end seal to have two semi-circular longitudinal cavities;
l. forming each end seal to have end walls;
m. positioning two of said members in a mating relation to define two enclosed cylindrical longitudinal cavities;
n. selecting a sizing tape comprising a base having a first surface and a second surface;
o. positioning a dry friction material on said first surface and;
p. positioning said first surface and said friction material to contact said end seal and positioning said second surface to contact the interior surface of said cylindrical case for ease of separation of said end seal and said cylindrical case; and
q. selecting said silicone sealant to have a Shore A durometer in the range 48 to 90 and a thickness in the range of 0.100 inches to 0.125 inches.

20. A process for making a protective cover according to claim 19 and comprising:
a. positioning said friction material to be in at least two strips and the distance between the two strips being at least two times the width of said strip.

21. A process for making a protective cover according to claim 19 and comprising:
a. positioning said friction material to be in splotches on said first surface and said splotches occupying less than one-third of the surface area of said first surface.

22. A protective cover for a cable splice and made by a process comprising:
a. forming a cylindrical case comprising two semi-circular members identified as a first member and a second member;
b. forming said first member to have a first side and a first flange on said first side and a second side and and a second flange on said second side;
c. forming said second member to have a third side and a third flange on said third side and a fourth side and a fourth flange on said fourth side;
d. uniting said first flange and said third flange;
e. uniting said second flange and said fourth flange;
f. positioning a silicone sealant between said first flange and said third flange;
g. positioning a silicone sealant between said second flange and said fourth flange;
h. forming said cylindrical case with two ends;
i. positioning end seals inside of said cylindrical case and near respective ends of said cylindrical case;
j. forming each end seal of two mating semi-circular members;
k. forming each member of each end seal to have two semi-circular longitudinal cavities;
l. forming each end seal to have end walls;
m. positioning two of said members in a mating relation to define two enclosed cylindrical longitudinal cavities;
n. selecting a sizing tape comprising a base having a first surface and a second surface;
o. positioning a dry friction material on said first surface and and said dry friction material to cover less than about one-third of said first surface;
p. positioning said first surface and said friction material to contact said end seal and positioning said second surface to contact the interior surface of said cylindrical case for ease of separation of said end seal and said cylindrical case; and
q. selecting said silicone sealant to have a Shore A durometer in the range 48 to 90 and a thickness in the range of 0.100 inches to 0.125 inches.

23. A protective cover for a cable splice and made by a process according to claim 22 and comprising:
a. positioning said friction material to be in at least two strips and the distance between the two strips being at least two times the width of said strip.

24. A protective cover for a cable splice and made by a process according to claim 22 and comprising:
   a. positioning said friction material to be in splotches on said first surface and said splotches occupying less than one-third of the surface area of said first surface.

25. A combination of a communication cable, an end seal and sizing tape, and comprising:
   a. the cable comprises a number of individual information transmitting members;
   b. the end seal comprises two mating half tubular members identified as a first tubular member and a second tubular member;
   c. each half tubular member has two spaced apart end walls identified as a first end wall and a second end wall and a circumferential outside wall defining a hollow interior and presenting in a lateral cross-sectional view a semicircular cylindrical configuration;
   d. aligned passageways in said first end wall and in said second end wall of each tubular member;
   e. aligned passageways in said two mating half tubular members;
   f. said sizing tape comprising:
      A. a base having a first surface and a second surface;
      B. a friction material bonded to said first surface and integral with said base;
      C. said friction material not being bonded to said second surface and not being integral with said second surface so as to allow said sizing tape to be formed into a roll which can be unwound;
   g. said sizing tape encircling said cable and wrapped around said cable forming an enlarged cable; and
   h. said enlarged cable being in said aligned passageways in said two mating half tubular members.

26. A combination of a communication cable, an end seal and sizing tape according to claim 25 and comprising:
   a. said sizing tape being resistant to rain, snow, hail, cold and freezing temperatures, ultraviolet light, hydrocarbons, gasoline, diesel, oil and kerosene; and
   b. flame resistant to low temperature flame.

27. A combination of a communication cable, an end seal and sizing tape according to claim 25 and comprising:
   a. said sizing tape being resistant to rain, snow, hail, cold and freezing temperatures, ultraviolet light, hydrocarbons, gasoline, diesel, oil and kerosene, and flame resistant to low temperature flame; and
   b. said friction material being in at least two strips and the distance between the two strips being at least two times the width of said strip.

28. A combination of a communication cable, an end seal and sizing tape according to claim 27 and comprising:
   a. said base having a thickness in the range of 0.035 inches to 0.045 inches; and,
   b. a Shore A hardness in the range of 60 to 80.

29. A combination of a communication cable, an end seal and sizing tape according to claim 25, and comprising:
   a. said sizing tape being resistant to rain, snow, hail, cold and freezing temperatures, ultraviolet light, hydrocarbons, gasoline, diesel, oil and kerosene, and flame resistant to low temperature flame; and,
   b. said friction material being in splotches on said first surface and said splotches occupying less than one-third of the surface area of said first surface.

30. A combination of a communication cable, an end seal and sizing tape according to claim 29 and comprising:
   a. a first surface; said base having a thickness in the range of 0.035 inches to 0.045 inches; and,
   b. a Shore A hardness in the range of 60 to 80.

31. A combination of a communication cable, an end seal and sizing tape according to claim 25 and comprising:
   a. the diameter of said enlarged cable being larger than the diameter of said aligned passageways so that the diameter of said enlarged cable outside of said aligned passageways is larger than the diameter of said enlarged cable in said passageways.

32. A combination of a communication cable, an end seal and sizing tape according to claim 25 and comprising:
   a. said sizing tape being wrapped around the circumferential wall of said first end seal to have a first external diameter larger than the internal diameter of said first end so that said first external diameter outside of said first end is larger than said first external diameter inside of said first end;
   b. said sizing tape being wrapped around the circumferential wall of said second end seal to have a second external diameter larger than the internal diameter of said second end so that said second external diameter outside of said second end is larger than said second external diameter inside of said second end; and,
   c. means to unite said first half tubular member and said second half tubular member to encompass said first end seal and said second end seal and said communication cable.

33. A combination of a communication cable, an end seal and sizing tape according to claim 25 and comprising:
   a. said combination enlarged to include a splice case to have a first half tubular member and a second half tubular member;
   b. said first half tubular member and said second half tubular member in combination defining a tubular member;
   c. said tubular member having a first end and a second end;
   d. there being a first end seal and a second end seal;
   e. said sizing tape being wrapped around the circumferential wall of said first end seal to have a first external diameter larger than the internal diameter of said first end so that said first external diameter outside of said first end is larger than said first external diameter inside of said first end;
   f. said sizing tape wrqpped around the circumferential wall of said second end seal to have a second external diameter larger than the internal diameter of said second end so that said second external diameter outside of said second end is larger than said second external diameter inside of said second end;
   g. means to unite said first half tubular member and said second half tubular member to encompass said first end seal and said second end seal and said communication cable;
   h. said base being flexible and yieldable;
   i. said sizing tape being resistant to rain, snow, hail, cold and freezing temperatures, ultraviolet light, hydrocarbons, gasoline, diesel, oil,kerosene; and,
   j. flame resistant to low temperature flame.

34. A combination of a communication cable, an end seal and sizing tape according to claim 25, and comprising:
 a. said combination enlarged to include a splice case to have a first half tubular member and a second half tubular member;
 b. said first half tubular member and said second half tubular member in combination defining a tubular member;
 c. said tubular member having a first end and a second end;
 d. there being a first end seal and a second end seal;
 e. said sizing tape wrapped around the circumferential wall of said first end seal to have a first external diameter larger than the internal diameter of said first end so that said first external diameter outside of said first end is larger than said first external diameter inside of said first end;
 f. said sizing tape being wrapaped around the circumferential wall of said second end seal to have a second external diameter larger than the internal diameter of said second end so than said second external diameter outside of second end is larger than said second external diameter inside of said second end;
 g. means to unite said first half tubular member and said second half tubular member to encompass said first end seal and aid second end seal and said communication cable;
 h. said base being flexible and yieldable;
 i. said sizing tape being resistant to rain, snow, hail, cold and freezing temperatures, ultraviolet light, hydrocarbons, gasoline, diesel, oil and kerosene, and flame resistant to low temperature flame; and,
 j. said friction material being in at least two strips and the distance between said two strips being at least two times the width of said strip.

35. A combination of a communication cable, an end seal and sizing tape according to claim 25 and comprising:
 a. said combination enlarged to include a splice case to have a first half tubular member and a second half tubular member;
 b. said first half tubular member and said second half tubular member in combination defining a tubular member;
 c. said tubular member having a first end and a second end;
 d. there being a first end seal and a second end seal;
 e. said sizing tape being wrapped around the circumferential wall of said first end seal to have a first external diameter larger than the internal diameter of said first end so that said first external diameter outside of said first end is larger than said first external diameter inside of said first end;
 f. said sizing tape being wrapped around the circumferential wall of said second end seal to have a second external diameter larger than the internal diameter of said second end so that said second external diameter outside of said second end is larger than said second external diameter inside of said second end;
 g. means to unite said first half tubular member and said second half tubular member to encompass said first end seal and said second end seal and said communication cable;
 h. said base being flexible and yieldable;
 i. said sizing tape being resistant to rain, snow, hail, cold and freezing temperatures, ultraviolet light, hydrocarbons, gasoline, diesel, oil and kerosene;
 j. flame resistant to low temperature flame;
 k. and said friction material being in splotches on said first surface and said splotches occupying less than one-third of the surface area of said first surface.

36. A combination of a communication cable, an end seal and sizing tape according to claim 25 and comprising:
 a. said combination enlarged to include a splice case having a first half tubular member and a second half tubular member;
 b. said first half tubular member and said second half tubular member in combination defining a tubular member;
 c. said tubular member having a first end and a second end;
 d. there being a first end seal and a second end seal;
 e. said sizing tape being wrapped around the circumferential wall of said first end seal to have a first external diameter larger than the internal diameter of said first end so that said first external diameter outside of said first end is larger than said first external diameter inside of said first end;
 f. said sizing tape being wrapped around the circumferential wall of said second end seal to have a second external diameter larger than the internal diameter of said second end so that said second external diameter outside of said second end is larger than said second external diameter inside of said second end;
 g. means to unite said first half tubular member and said second half tubular member to encompass said first end seal and aid second end seal and said communication cable;
 h. said base being flexible and yieldable;
 i. said sizing tape being resistant to rain, snow, hail, cold and freezing temperatures, ultraviolet light, hydrocarbons, gasoline, diesel, oil and kerosene, and flame resistant to low temperature flame;
 j. said friction material being in at least two strips and the distance between said two strips being at least two times the width of said strip;
 k. said base having a thickness in the range of 0.035 inches to 0.045 inches; and,
 l. a Shore A hardness in the range of 60 to 80.

37. A combination of a communication cable, an end seal and sizing tape according to claim 25 and comprising:
 a. said combination enlarged to include a splice case to have a first half tubular member and a second half tubular member;
 b. said first half tubular member and said second half tubular member in combination defining a tubular member;
 c. said tubular member having a first end and a second end;
 d. there being a first end seal and a second end seal;
 e. said sizing tape being wrapped around the circumferential wall of said first end seal to have a first external diameter larger than the internal diameter of said first end so that said first external diameter outside of said first end is larger than said first external diameter inside of said first end;
 f. said sizing tape being wrapped around the circumferential wall of said second end seal to have a second external diameter larger than the internal diameter of said second end so that said second external diameter outside of said second end is larger than said second external diameter inside of said second end;

g. means to unite said first half tubular member and said second half tubular member to encompass said first end seal and aid second end seal and said communication cable;

h. said base being flexible and yieldable;

i. said sizing tape being resistant to rain, snow, hail, cold and freezing temperatures, ultraviolet light, hydrocarbons, gasoline, diesel, oil and kerosene;

j. flame resistant to low temperature flame;

k. said friction material being in splotches on said first surface and said splotches occupying less than one-third of the surface area of said first surface; and, l. said base having a thickness in the range of 0.035 inches to 0.045 inches; and, l. a Shore A hardness in the range of 60 to 80.

38. A combination of a communication cable, an end seal and sizing tape according to claim 25 and comprising:

a. said combination enlarged o include a splice case to have a first half tubular member and a second half tubular member;

b. said first half tubular member and said second half tubular member in combination defining a tubular member;

c. said tubular member having a first end and a second end;

d. there being a first end seal and a second end seal;

e. said sizing tape being wrapped around the circumferential wall of said first end seal to have a first external diameter larger than the internal diameter of said first end so that said first external diameter outside of said first end is larger than said first external diameter inside of said first end;

f. said sizing tape being wrapped around the circumferential wall of said second end seal to have a second external diameter larger than the internal diameter of said second end so that said second external diameter outside of said second end is larger than said second external diameter inside of said second end;

g. means to unite said first half tubular member and said second half tubular member to encompass said first end seal and said second end seal and said communication cable;

h. said base being flexible and yieldable;

i. said sizing tape being resistant to rain, snow, hail, cold and freezing temperatures, ultraviolet light, hydrocarbons, gasoline, diesel, oil and kerosene;

j. flame resistant to low temperature flame;

k. said friction material being in at least two strips and the distance between said two strips being at least two times the width of said strip;

l. said base having a thickness in the range of 0.035 inches to 0.045 inches;

m. a Shore A hardness in the range of 60 to 80, and n. the diameter of said enlarged cable being larger than the diameter of said aligned passageways so that the diameter of said enlarged cable outside of said aligned passageways is larger than the diameter of said enlarged cable in said passageways.

39. A combination of a communication cable, an end seal and sizing tape according to claim 25 and comprising:

a. said combination enlarged to include a splice case to have a first half tubular member and a second half tubular member;

b. said first half tubular member and said second half tubular member in combination defining a tubular member;

c. said tubular member having a first end and a second end;

d. there being a first end seal and a second end seal;

e. said sizing tape being wrapped around the circumferential wall of said first end seal to have a first external diameter larger than the internal diameter of said first end so that said first external diameter outside of said first end is larger than said first external diameter inside of said first end;

f. said sizing tape being wrapped around the circumferential wall of said second end seal to have a second external diameter larger than the internal diameter of said second end so that said second external diameter outside of said second end is larger than said second external diameter inside of said second end;

g. means to unite said first half tubular member and said second half tubular member to encompass said first end seal and said second end seal and said communication cable;

h. said base being flexible and yieldable;

i. said sizing tape being resistant to rain, snow, hail, cold and freezing temperatures, ultraviolet light, hydrocarbons, gasoline, diesel, oil and kerosene, and flame resistant to low temperature flame;

j. said friction material being in splotches on said first surface and said splotches occupying less than one-third of the surface area of said first surface;

k. said base having a thickness in the range of 0.035 inches to 0.045 inches; and, l. a Shore A hardness in the range of 60 to 80, m. the diameter of said enlarged cable being larger than the diameter of said aligned passageways so that the diameter of enlarged cable outside of said aligned passageways is larger than the diameter of said enlarged cable in said aligned passaageways in said passageways.

40. A process for making a combination of a communication cable, an end seal and sizing tape, and comprising:

a. selecting said cable to comprise a number of individual information transmitting members;

b. selecting the end seal to comprise two mating half tubular members identified as a first tubular member and a second tubular member;

c. selecting each half tubular member to have two spaced apart end walls identified as a first end wall and a second end wall and a circumferential outside wall defining a hollow interior and presenting in a lateral cross-sectional view a semicircular cylindrical configuration;

d. aligning passageways in said first end wall and in said second end wall of each tubular member;

e. aligning passageways in said two mating half tubular members;

f. selecting said sizing tape to comprise;

A. a base having a first surface and a second surface;

B. a friction material bonded to said first surface and integral with said base;

C. said friction material not being bonded to said second surface and not being integral with said second surface so as to allow said sizing tape to be formed into a roll which can be unwound;

g. positioning said sizing tape to encircle said cable and to wrap around said cable to form an enlarged cable; and h. positioning said enlarged cable to be in said aligned passageways in said two mating half tubular members.

41. A process for making a combination of a communication cable, an end seal and sizing tape according to claim 40 and comprising:

a. selecting said sizing tape to be resistant to rain, snow, hail, cold and freezing temperatures, ultraviolet light, hydrocarbons, gasoline, diesel, oil and kerosene; and b. to be flame resistant to low temperature flame.

42. A process for making a combination of a communication cable, an end seal and sizing tape according to claim 40 and comprising:

a. selecting said sizing tape to be resistant to rain, snow, hail, cold and freezing temperatures, ultraviolet light, hydrocarbons, gasoline, diesel, oil and kerosene, and flame resistant to low temperature flame; and, b. selecting said friction material to be in at least two strips and the distance between the two strips being at least two times the width of said strip.

43. A process for making a combination of a communication cable, an end seal and sizing tape according to claim 42 and comprising:

a. selecting said base to have a thickness in the range of 0.035 inches to 0.045 inches; and, b. a Shore A hardness in the range of 60 to 80.

44. A process for making a combination of a communication cable, an end seal and sizing tape according to claim 40, and comprising:

a. selecting said sizing tape to be resistant to rain, snow, hail, cold and freezing temperatures, ultraviolet light, hydrocarbons, gasoline, diesel, oil and kerosene, and flame resistant to low temperature flame; and, b. selecting said friction material to be in splotches on said first surface and said splotches occupying less than one-third of the surface area of said first surface.

45. A process for making a combination of a communication cable, an end seal and sizing tape according to claim 44 and comprising:

a. selecting said base to have a thickness in the range of 0.035 inches to 0.045 inches; and, b. a Shore A hardness in the range of 60 to 80.

46. A process for making a combination of a communication cable, an end seal and sizing tape according to claim 40 and comprising:

a. selecting the diameter of said enlarged cable to be larger than the diameter of said aligned passageways so that the diameter of said enlarged cable outside of said aligned passageways is larger than the diameter of said enlarged cable in said passageways.

47. A process for making a combination of a communication cable, an end seal and sizing tape according to claim 40 and comprising:

a. selecting said sizing tape to be wrapped around the circumferential wall of said first end seal to have a first external diameter larger than the internal diameter of said first end so that said first external diameter outside of said first end is larger than said first external diameter inside of said first end;

b. selecting said sizing tape to be wrapped around the circumferential wall of said second end seal to have a second external diameter larger than the internal diameter of said second end so that said second external diameter outside of said second end is larger than said second external diameter inside of said second end; and, c. uniting said first half tubular member and said second half tubular member to encompass said first end seal and said second end seal and said communication cable.

48. A process for making a combination of a communication cable, an end seal and sizing tape according to claim 40 and comprising:

a. enlarging said combination to include a splice case to have a first half tubular member and a second half tubular member;

b. said first half tubular member and said second half tubular member in combination defining a tubular member;

c. said tubular member having a first end and a second end;

d. there being a first end seal and a second end seal;

e. wrapping said sizing tape around the circumferential wall of said first end seal to have a first external diameter larger than the internal diameter of said first end so that said first external diameter outside of said first end is larger than said first external diameter inside of said first end;

f. wrapping said sizing tape around the circumferential wall of said second end seal to have a second external diameter larger than the internal diameter of said second end so that said second external diameter outside of said second end is larger than said second external diameter inside of said second end;

g. uniting said first half tubular member and said second half tubular member to encompass said first end seal and said second end seal and said communication cable;

h. selecting said base to be flexible and yieldable;

i. selecting said sizing tape to be resistant to rain, snow, hail, cold and freezing temperatures, ultraviolet light, hydrocarbons, gasoline, diesel, oil, kerosene; and, j. flame resistant to low temperature flame.

49. A process for making a combination of a communication cable, an end seal and sizing tape according to claim 40, and comprising:

a. enlarging said combination to include a splice case to have a first half tubular member and a second half tubular member;

b. said first half tubular member and said second half tubular member in combination defining a tubular member;

c. said tubular member having a first end and a second end;

d. there being a first end seal and a second end seal;

e. wrapping said sizing tape around the circumferential wall of said first end seal to have a first external diameter larger than the internal diameter of said first end so that said first external diameter outside of said first end is larger than said first external diameter inside of said first end;

f. wrapping said sizing tape around the circumferential wall of said second end seal to have a second external diameter larger than the internal diameter of said second end so that said second external diameter outside of said second end is larger than said second external diameter inside of said second end;

g. uniting said first half tubular member and said second half tubular member to encompass said first end seal and aid second end seal and said communication cable;

h. selecting said base to be flexible and yieldable;

i. selecting said sizing tape to be resistant to rain, snow, hail, cold and freezing temperatures, ultraviolet light, hydrocarbons, gasoline, diesel, oil and kerosene, and flame resistant to low temperature flame; and, j. positioning said friction material to be in at least two strips and the distance between said two strips being at least two times the width of said strip.

50. A process for making a combination of a communication cable, an end seal and sizing tape according to claim 40 and comprising:

a. enlarging said combination to include a splice case having a first half tubular member and a second half tubular member;

b. said first half tubular member and said second half tubular member in combination defining a tubular member;

c. said tubular member having a first end and a second end;

d. there being a first end seal and a second end seal;

e. wrapping said sizing tape around the circumferential wall of said first end seal to have a first external diameter larger than the internal diameter of said first end so that said first external diameter outside of said first end is larger than said first external diameter inside of said first end;

f. wrapping said sizing tape around the circumferential wall of said second end seal to have a second external diameter larger than the internal diameter of said second end so that said second external diameter outside of said second end is larger than said second external diameter inside of said second end;

g. uniting said first half tubular member and said second half tubular member to encompass said first end seal and said second end seal and said communication cable;

h. selecting said base to be flexible and yieldable;

i. selecting said sizing tape to be resistant to rain, snow, hail, cold and freezing temperatures, ultraviolet light, hydrocarbons, gasoline, diesel, oil and kerosene;

j. flame resistant to low temperature flame; and, k. positioning said friction material to be in splotches on said first surface for said splotches occupy less than one-third of the surface area of said first surface.

51. A process for making a combination of a communication cable, an end seal and sizing tape according to claim 40 and comprising:

a. enlarging said combination to include a splice case having a first half tubular member and a second half tubular member;

b. said first half tubular member and said second half tubular member in combination defining a tubular member;

c. said tubular member having a first end and a second end;

d. there being a first end seal and a second end seal;

e. wrapping said sizing tape around the circumferential wall of said first end seal to have a first external diameter larger than the internal diameter of said first end so that said first external diameter outside of said first end is larger than said first external diameter inside of said first end;

f. wrapping said sizing tape around the circumferential wall of said second end seal to have a second external diameter larger than the internal diameter of said second end so that said second external diameter outside of said second end is larger than said second external diameter inside of said second end;

g. uniting said first half tubular member and said second half tubular member to encompass said first end seal and aid second end seal and said communication cable;

h. selecting said base to be flexible and yieldable;

i. selecting said sizing tape to be resistant to rain, snow, hail, cold and freezing temperatures, ultraviolet light, hydrocarbons, gasoline, diesel, oil and kerosene, and flame resistant to low temperature flame;

j. positioning said friction material to be in at least two strips with the distance between said two strips being at least two times the width of said strip;

k. selecting said base to have a thickness in the range of 0.035 inches to 0.045 inches; and, l. a Shore A hardness in the range of 60 to 80.

52. A process for making a combination of a communication cable, an end seal and sizing tape according to claim 40 and comprising:

a. enlarging said combination to include a splice case having a first half tubular member and a second half tubular member;

b. said first half tubular member and said second half tubular member in combination defining a tubular member;

c. said tubular member having a first end and a second end;

d. there being a first end seal and a second end seal;

e. wrapping said sizing tape around the circumferential wall of said first end seal to have a first external diameter larger than the internal diameter of said first end so that said first external diameter outside of said first end is larger than said first external diameter inside of said first end;

f. wrapping said sizing tape around the circumferential wall of said second end seal to have a second external diameter larger than the internal diameter of said second end so that said second external diameter outside of said second end is larger than said second external diameter inside of said second end;

g. uniting said first half tubular member and said second half tubular member to encompass said first end seal and said second end seal and said communication cable;

h. selecting said base to be flexible and yieldable;

i. selecting said sizing tape to be resistant to rain, snow, hail, cold and freezing temperatures, ultraviolet light, hydrocarbons, gasoline, diesel, oil and kerosene and flame resistant to low temperature flame;

j. positioning said friction material to be in splotches on said first surface and said splotches occupying less than one-third of the surface area of said first surface; and, k. selecting said base to have a thickness in the range of 0.035 inches to 0.045 inches; and, l. selecting said base to have a Shore A hardness in the range of 60 to 80.

53. A process for making a combination of a communication cable, an end seal and sizing tape according to claim 40 and comprising:

a. enlarging said combination to include a splice case to have a first half tubular member and a second half tubular member;

b. said first half tubular member and said second half tubular member in combination defining a tubular member;
c. said tubular member having a first end and a second end;
d. there being a first end seal and a second end seal;
e. wrapping said sizing tape around the circumferential wall of said first end seal to have a first external diameter larger than the internal diameter of said first end so that said first external diameter outside of said first end is larger than said first external diameter inside of said first end;
f. wrapping said sizing tape around the circumferential wall of said second end seal to have a second external diameter larger than the internal diameter of said second end so that said second external diameter outside of said second end is larger than said second external diameter inside of said second end.

54. A process for making a combination of a communication cable, an end seal and sizing tape according to claim 40 and comprising:
a. enlarging said combination to include a splice case having a first half tubular member and a second half tubular member;
b. said first half tubular member and said second half tubular member in combination defining a tubular member;
c. said tubular member having a first end and a second end;
d. there being a first end seal and a second end seal;
e. wrapping said sizing tape around the circumferential wall of said first end seal to have a first external diameter larger than the internal diameter of said first end so that said first external diameter outside of said first end is larger than said first external diameter inside of said first end;
f. wrapping said sizing tape around the circumferential wall of said second end seal to have a second external diameter larger than the internal diameter of said second end so that said second external diameter outside of said second end is larger than said second external diameter inside of said second end;
g. uniting said first half tubular member and said second half tubular member to encompass said first end seal and said second end seal and said communication cable;
h. said base being flexible and yieldable;
i. said sizing tape being resistant to rain, snow, hail, cold and freezing temperatures, ultraviolet light, hydrocarbons, gasoline, diesel, oil and kerosene, and flame resistant to low temperature flame;
j. positioning said friction material to be in splotches on said first surface and said splotches occupying less than one-third of the surface area of said first surface;
k. selecting said base to have a thickness in the range of 0.035 inches to 0.045 inches;
l. selecting said base to have a Shore A hardness in the range of 60 to 80; and,
m. the diameter of said enlarged cable being larger than the diameter of said aligned passageways so that the diameter of enlarged cable outside of said aligned passageways is larger than the diameter of said enlarged cable in said aligned passaageways in said passageways.

* * * * *